(12) United States Patent
Duan et al.

(10) Patent No.: US 11,352,172 B2
(45) Date of Patent: Jun. 7, 2022

(54) RESEALABLE LAMINATE FOR HEAT SEALED PACKAGING

(71) Applicant: Avery Dennison Corporation, Glendale, CA (US)

(72) Inventors: Xinrong Duan, Shanghai (CN); Martin Daffner, Long Beach, CA (US); ZhiJian Xue, Shanghai (CN)

(73) Assignee: Avery Dennison Corporation, Mentor, OH (US)

( * ) Notice: Subject to any disclaimer, the term of this patent is extended or adjusted under 35 U.S.C. 154(b) by 0 days.

(21) Appl. No.: 16/891,686

(22) Filed: Jun. 3, 2020

(65) Prior Publication Data

US 2020/0290774 A1 Sep. 17, 2020

Related U.S. Application Data

(60) Division of application No. 13/637,993, filed on Sep. 28, 2012, now Pat. No. 10,710,773, which is a
(Continued)

(51) Int. Cl.
*B32B 27/32* (2006.01)
*B65D 33/20* (2006.01)
(Continued)

(52) U.S. Cl.
CPC ............. *B65D 33/20* (2013.01); *B32B 7/03* (2019.01); *B32B 7/06* (2013.01); *B32B 7/12* (2013.01);
(Continued)

(58) Field of Classification Search
CPC ........ B65D 33/20; B65D 33/00; B65D 33/24; B65D 75/5833; B65D 65/14; B65D 65/40;
(Continued)

(56) References Cited

U.S. PATENT DOCUMENTS 3,329,331 A 7/1967 Morgan
3,426,936 A 2/1969 Palmer
(Continued)

FOREIGN PATENT DOCUMENTS

CA 2360764 7/2000
CN 1571728 1/2005
(Continued)

OTHER PUBLICATIONS

International Search Report and Written Opinion dated Nov. 16, 2010 issued in corresponding International Application No. PCT/US2010/048558 filed Sep. 13, 2010.
(Continued)

*Primary Examiner* — James C Yager
(74) *Attorney, Agent, or Firm* — Avery Dennison Corporation

(57) ABSTRACT

A resealable package assembly is described. The package assembly includes a selectively positionable flap that covers an aperture or enables access through the aperture into the package. The flap and package include provisions for releasably engaging the flap to the package to seal the interior of the package. Provisions for grasping the tab and indicating whether tampering has occurred are also described.

27 Claims, 7 Drawing Sheets

Related U.S. Application Data continuation-in-part of application No. PCT/US2010/048558, filed on Sep. 13, 2010.

(60) Provisional application No. 61/241,416, filed on Sep. 11, 2009.

(51) Int. Cl.
| | |
|---|---|
| *B65D 75/58* | (2006.01) |
| *B32B 7/06* | (2019.01) |
| *B32B 27/18* | (2006.01) |
| *B32B 27/40* | (2006.01) |
| *B32B 25/14* | (2006.01) |
| *B32B 27/30* | (2006.01) |
| *B32B 25/08* | (2006.01) |
| *B32B 27/34* | (2006.01) |
| *B32B 27/36* | (2006.01) |
| *B32B 7/12* | (2006.01) |
| *B32B 27/10* | (2006.01) |
| *B32B 27/28* | (2006.01) |
| *B32B 7/03* | (2019.01) |
| *B65D 33/00* | (2006.01) |
| *B65D 33/24* | (2006.01) |
| *B32B 27/08* | (2006.01) |
| *B65D 65/14* | (2006.01) |
| *B65D 65/40* | (2006.01) |

(52) U.S. Cl.
CPC .............. *B32B 25/08* (2013.01); *B32B 25/14* (2013.01); *B32B 27/08* (2013.01); *B32B 27/10* (2013.01); *B32B 27/18* (2013.01); *B32B 27/286* (2013.01); *B32B 27/302* (2013.01); *B32B 27/304* (2013.01); *B32B 27/306* (2013.01); *B32B 27/308* (2013.01); *B32B 27/32* (2013.01); *B32B 27/322* (2013.01); *B32B 27/325* (2013.01); *B32B 27/34* (2013.01); *B32B 27/36* (2013.01); *B32B 27/40* (2013.01); *B65D 33/00* (2013.01); *B65D 33/24* (2013.01); *B65D 65/14* (2013.01); *B65D 65/40* (2013.01); *B65D 75/5833* (2013.01); *B65D 75/5855* (2013.01); *B32B 2250/24* (2013.01); *B32B 2255/10* (2013.01); *B32B 2255/205* (2013.01); *B32B 2255/26* (2013.01); *B32B 2270/00* (2013.01); *B32B 2307/31* (2013.01); *B32B 2307/514* (2013.01); *B32B 2307/58* (2013.01); *B32B 2307/7244* (2013.01); *B32B 2307/7246* (2013.01); *B32B 2307/748* (2013.01); *B32B 2307/75* (2013.01); *B32B 2439/00* (2013.01); *B32B 2439/46* (2013.01); *B32B 2439/70* (2013.01); *B65D 2575/586* (2013.01); *Y10T 428/1379* (2015.01); *Y10T 428/1383* (2015.01); *Y10T 428/1424* (2015.01); *Y10T 428/1452* (2015.01); *Y10T 428/1457* (2015.01); *Y10T 428/1462* (2015.01); *Y10T 428/1476* (2015.01); *Y10T 428/24802* (2015.01); *Y10T 428/24942* (2015.01)

(58) Field of Classification Search
CPC .......... B65D 75/5855; B65D 2575/586; B32B 27/325; B32B 7/06; B32B 27/18; B32B 27/40; B32B 25/14; B32B 27/302; B32B 25/08; B32B 27/304; B32B 27/34; B32B 27/36; B32B 7/12; B32B 27/10; B32B 27/306; B32B 27/308; B32B 27/286; B32B 27/322; B32B 7/03; B32B 27/08; B32B 27/32; B32B 2307/31; B32B 2255/10; B32B 2307/514; B32B 2255/26; B32B 2255/205; B32B 2307/58; B32B 2270/00; B32B 2307/748; B32B 2307/75; B32B 2250/24; B32B 2307/7244; B32B 2307/7246; B32B 2439/00; B32B 2439/46; B32B 2439/70; Y10T 428/24802; Y10T 428/1379; Y10T 428/1383; Y10T 428/24942; Y10T 428/1424; Y10T 428/1452; Y10T 428/1457; Y10T 428/1462; Y10T 428/1476

See application file for complete search history.

(56) References Cited

U.S. PATENT DOCUMENTS

| | | |
|---|---|---|
| 3,498,448 A | 3/1970 | Kuster |
| 3,941,248 A | 3/1976 | Moser et al. |
| 4,260,061 A | 4/1981 | Jacobs |
| 4,468,811 A | 8/1984 | Shaw et al. |
| 4,673,601 A | 6/1987 | Lamping et al. |
| 4,810,541 A | 3/1989 | Newman et al. |
| 3,454,210 A | 7/1989 | Spiegel et al. |
| 4,884,563 A | 12/1989 | Sessions |
| 4,956,212 A | 9/1990 | Bekele |
| 5,046,618 A | 9/1991 | Wood |
| 5,064,664 A | 11/1991 | Hustad et al. |
| 5,089,320 A | 2/1992 | Straus et al. |
| 5,160,767 A | 11/1992 | Genske et al. |
| 5,184,771 A | 2/1993 | Jud et al. |
| 5,217,307 A | 6/1993 | McClintock |
| 5,325,968 A | 7/1994 | Sowden |
| 5,382,472 A | 1/1995 | Yanidis et al. |
| 5,623,011 A | 4/1997 | Bernard |
| 5,728,469 A | 3/1998 | Mann et al. |
| 5,758,774 A | 6/1998 | Leblong |
| 5,766,401 A | 6/1998 | Campbell et al. |
| 5,798,169 A | 8/1998 | Smith |
| 5,830,571 A | 11/1998 | Mann et al. |
| 5,857,565 A | 1/1999 | Baker et al. |
| 5,882,749 A | 3/1999 | Jones et al. |
| 5,882,789 A | 3/1999 | Jones et al. |
| 5,919,547 A | 7/1999 | Kocher et al. |
| 5,954,430 A | 9/1999 | Turtiainen et al. |
| 6,056,141 A | 5/2000 | Navarini et al. |
| 6,147,165 A | 11/2000 | Keller et al. |
| 6,302,290 B1 | 10/2001 | Engelaere |
| 6,475,578 B1 | 11/2002 | Gerrits et al. |
| 6,486,267 B1 | 11/2002 | Bilodeau |
| 6,630,237 B2 | 10/2003 | Rivett et al. |
| 6,737,130 B2 | 5/2004 | Ferri |
| 6,752,431 B1 | 6/2004 | Matthews et al. |
| 6,777,050 B1 | 8/2004 | Engelaere |
| 6,893,672 B2 | 5/2005 | Ingraham |
| 6,902,817 B2 | 6/2005 | Bowen et al. |
| 7,165,888 B2 | 1/2007 | Rodick |
| 7,322,473 B2 | 1/2008 | Fux |
| 7,371,008 B2 | 5/2008 | Bonenfant |
| 7,422,142 B2 | 9/2008 | Arippol |
| 7,422,782 B2 | 9/2008 | Haedt et al. |
| 7,681,732 B2 | 3/2010 | Moehlenbrock et al. |
| 8,051,983 B2 | 11/2011 | Simon et al. |
| 8,114,451 B2 | 2/2012 | Sierra-Gomez et al. |
| 8,551,588 B2 | 10/2013 | Daffner et al. |
| 2003/0183643 A1 | 10/2003 | Fagen et al. |
| 2004/0013827 A1 | 1/2004 | Zuser et al. |
| 2004/0033379 A1 | 2/2004 | Chiao et al. |
| 2004/0134459 A1 | 7/2004 | Korenjak et al. |
| 2004/0180118 A1 | 9/2004 | Renger et al. |
| 2004/0191459 A1 | 9/2004 | Driesten |
| 2005/0031233 A1 | 2/2005 | Varanese et al. |
| 2005/0074549 A1 | 4/2005 | Su et al. |
| 2005/0220376 A1 | 10/2005 | Tsukanmoe et al. |
| 2005/0276525 A1 | 12/2005 | Hebert et al. |
| 2006/0032775 A1 | 2/2006 | Forman et al. |

(56) References Cited

U.S. PATENT DOCUMENTS

| | | |
|---|---|---|
| 2006/0172131 A1 | 8/2006 | Haedt et al. |
| 2007/0082161 A1 | 4/2007 | Cruz et al. |
| 2007/0095709 A1 | 5/2007 | Saito et al. |
| 2007/0104901 A1 | 5/2007 | Siegel et al. |
| 2007/0116910 A1 | 5/2007 | Polykarpov et al. |
| 2007/0119742 A1 | 5/2007 | Thielman et al. |
| 2007/0134459 A1 | 6/2007 | Hubert et al. |
| 2007/0275133 A1 | 11/2007 | Sierra-Gomez et al. |
| 2008/0105582 A1 | 5/2008 | Ludwig et al. |
| 2008/0118688 A1 | 5/2008 | Kinigakis et al. |
| 2008/0156861 A1 | 7/2008 | Sierra-Gomez et al. |
| 2008/0190809 A1 | 8/2008 | Simon et al. |
| 2008/0240627 A1 | 10/2008 | Cole et al. |
| 2009/0226117 A1 | 9/2009 | Davis et al. |
| 2009/0273179 A1 | 11/2009 | Scott et al. |
| 2009/0304874 A1 | 12/2009 | Stephens et al. |
| 2010/0019022 A1 | 1/2010 | Ryan et al. |
| 2010/0150481 A1 | 6/2010 | Perell et al. |
| 2010/0172604 A1 | 7/2010 | Andersson et al. |
| 2010/0278454 A1 | 11/2010 | Huffer |
| 2012/0067896 A1 | 3/2012 | Daffner et al. |
| 2012/0177307 A1 | 7/2012 | Duan et al. |
| 2013/0020328 A1 | 1/2013 | Duan et al. |
| 2013/0056470 A1 | 3/2013 | Hallak |
| 2013/0177263 A1 | 7/2013 | Duan et al. |

FOREIGN PATENT DOCUMENTS

| | | |
|---|---|---|
| CN | 101076480 | 11/2007 |
| CN | 100526171 | 8/2009 |
| CN | 101580153 | 11/2009 |
| CN | 101815610 | 8/2010 |
| CN | 101284587 | 12/2011 |
| CN | 101186800 | 3/2013 |
| CN | 102143898 | 3/2013 |
| DE | 102006002965 | 11/2009 |
| EP | 0447636 | 9/1991 |
| EP | 0608801 | 8/1994 |
| EP | 1016598 | 7/2000 |
| EP | 1193294 | 4/2002 |
| EP | 1449789 | 8/2004 |
| EP | 1077186 | 6/2005 |
| EP | 1582341 | 10/2005 |
| EP | 1358068 | 6/2006 |
| EP | 1685954 | 8/2006 |
| EP | 1775122 | 4/2007 |
| GB | 2319746 | 6/1998 |
| JP | 2-258576 | 10/1990 |
| JP | 8-151069 | 6/1996 |
| JP | 9-110077 | 4/1997 |
| JP | 10-230575 | 9/1998 |
| JP | 2005-035671 | 2/2005 |
| JP | 2007-314187 | 12/2007 |
| JP | 2008-502555 | 1/2008 |
| KR | 10-2006-0050763 | 5/2006 |
| RU | 2196089 | 1/2003 |
| RU | 2274553 | 4/2006 |
| RU | 2347731 | 2/2009 |
| RU | 2363632 | 8/2009 |
| WO | 1994/029104 | 12/1994 |
| WO | 1996/003329 | 2/1996 |
| WO | 2002/066341 | 8/2002 |
| WO | 2004/074130 | 9/2004 |
| WO | 2005/014406 | 2/2005 |
| WO | 2005/123535 | 12/2005 |
| WO | 2006/135315 | 12/2006 |
| WO | 2008/086388 | 7/2008 |
| WO | 2008/115693 | 9/2008 |
| WO | 2009/089009 | 7/2009 |

OTHER PUBLICATIONS

International Preliminary Report on Patentability dated Mar. 13, 2012 issued in corresponding International Application No. PCT/US2010/048558 filed Sep. 13, 2010.
International Preliminary Report on Patentability issued in corresponding IA No. PCT/US2010/029352 dated Oct. 13, 2011.
International Search Report and Written Opinion issued in corresponding IA No. PCT/US2011/037637 dated Sep. 21, 2011.
International Preliminary Report on Patentability issued in corresponding IA No. PCT/US2011/030255 dated Oct. 11, 2012.
International Search Report and Written Opinion issued in corresponding IA No. PCT/US2011/030255 dated Jun. 30, 2011.
International Search Report and Written Opinion issued in corresponding IA No. PCT/US2011/030246 dated Aug. 11, 2011.
International Search Report and Written Opinion issued in corresponding IA No. PCT/US2010/029352 dated May 27, 2010.
International Preliminary Report on Patentability issued in corresponding IA No. PCT/US2011/037637 dated Nov. 27, 2012.
International Preliminary Report on Patentability issued in corresponding IA No. PCT/US2011/030246 dated Mar. 19, 2013.

RESEALABLE LAMINATE FOR HEAT SEALED PACKAGING

CROSS-REFERENCE TO RELATED APPLICATION

The present application is a division of U.S. patent application Ser. No. 13/637,993 filed Sep. 28, 2012, which is a Continuation-In-Part of International Application No. PCT/US2010/048558 filed Sep. 13, 2010, which claims priority to U.S. Provisional Application No. 61/241,416 filed Sep. 11, 2009. The present application is also a 371 of International Application No. PCT/US2011/030246, which was published in English on Mar. 22, 2011. All of the foregoing applications are incorporated herein by reference in their entireties.

FIELD OF THE INVENTION

The present invention relates to heat sealable, flexible wall, disposable packages that are also resealable.

BACKGROUND OF THE INVENTION

A wide array of resealable packages or containers are known. Typically, a container such as in the form of a flexible bag or rigid walled housing, is provided with an opening that serves to provide access to the interior of the container. A lid or cover is positioned over the opening and bonded to the container, typically by heat sealing, to enclose and seal the container interior and its contents from the external environment. For bag type containers, a portion of the flexible wall of the bag may serve as the cover and be folded or otherwise positioned over an opening in the bag. A reseal feature enables the lid or cover, or a portion thereof, to be removed or otherwise repositioned so as to allow access to the interior of the container. After accessing the interior of the container, the lid or cover can be appropriately positioned over the opening and engaged with the container to thereby reseal the container.

Numerous strategies have been devised for the lid or cover to overlay a container opening and engage the container to thereby seal the interior of the container from the outside environment. An example of a sealing strategy is the provision of a layer of a pressure sensitive adhesive on the contacting surfaces of the lid or cover, and/or the corresponding region of the container extending about the periphery of the opening. This latter strategy is widely used, particularly for disposable packaging as used for storing and preserving perishable items such as food in which it is desirable to minimize exposure to air.

Although satisfactory in certain respects, the production of resealable packaging is relatively expensive. Currently known resealable, flexible wall, disposable packaging utilizes different adhesive compositions at different locations in the package. For example, a permanent adhesive may be used along seams or other end regions for sealing, and a pressure sensitive adhesive may be used in the region of a resealable lid or cover. This increases manufacturing complexity and cost, and also reduces production rates of the packaging. Accordingly, it would be desirable to provide a new disposable packaging container or assembly and particularly one that is resealable, that could be manufactured in a high speed and high volume environment. Moreover, it would be desirable to provide a resealable package configuration that was relatively inexpensive as compared to currently known resealable packages.

SUMMARY OF THE INVENTION

The difficulties and drawbacks associated with previous systems and methods are overcome by the present invention for a resealable package assembly.

In one aspect, the present invention provides a packaging laminate comprising a first polymeric layer, a second polymeric layer, and an adhesive layer disposed between the first layer and the second layer. The first polymeric layer and the second polymeric layer exhibit a two dimensional vector delta CTE (or CTS) value Q of less than 1,000 µm/m ° C.

In another aspect, the present invention provides a resealable packaging laminate comprising an outer layer, the outer layer defining an outer face, a pressure sensitive adhesive layer adjacent to the outer layer, an inner sealing layer, the inner sealing layer defining an inner face, a filmic layer adjacent to the inner sealing layer, and a release layer disposed between the pressure sensitive adhesive layer and the filmic layer. The release layer is at least in partial contact with the pressure sensitive adhesive layer. The inner face defines an inner die cut extending through the sealing layer, the filmic layer, and the release layer to thereby define an inner flap portion. The outer face defines an outer die cut extending through the outer layer and the pressure sensitive adhesive layer to thereby define an outer flap portion. The inner flap portion and the outer flap portion are secured to each other to thereby provide a positionable flap partially connected to the packaging laminate. The outer die cut and the inner die cut define a resealable region extending between the outer die cut and the inner die cut. The resealable region in the flap includes a portion of the pressure sensitive adhesive layer and the resealable region in the packaging laminate including a portion of the release layer. The outer layer and the filmic layer exhibit a two dimensional vector delta CTE (or CTS) value Q of less than 1,000 µm/m ° C.

In another aspect, the invention provides a resealable bag container. The container includes two end sections and at least one multilayer side wall extending therebetween to thereby define a hollow interior. The container includes a selectively positionable flap. The flap is at least partially connected to a portion of the side wall of the container and positionable over an aperture defined in the side wall. The flap defines a first sealing region extending along an inner face of the flap. The flap includes an adhesive layer exposed in the first sealing region. The side wall defines a second sealing region extending about the aperture. The side wall includes a release layer exposed in the second sealing region. The flap is configured to releasably seal with the side wall by contacting the exposed adhesive layer of the flap with the exposed release layer of the side wall. The multilayer side wall of the container includes an adhesive layer having the same composition as the adhesive layer in the flap. The flap further defines a flap remainder region exclusive of the first sealing region. The flap includes a plurality of layers in the flap remainder region. The plurality of layers in the flap remainder region comprises an outer layer, an adhesive layer adjacent to the outer layer, an inner sealing layer, a filmic layer adjacent to the inner sealing layer; and a release layer disposed between the adhesive layer and the filmic layer. The release layer contacts the adhesive layer. The outer layer and the filmic layer exhibit a two dimensional vector delta CTE (or CTS) value Q of less than 1,000 µm/m ° C.

In still another aspect, the invention provides a resealable packaging laminate comprising an outer laminate portion including a pressure sensitive adhesive layer. The outer laminate portion defines an outer die cut. The outer die cut extends across a region of the outer laminate to define an outer flap portion. The outer flap portion is at least partially connected to the packaging laminate. The laminate further comprises an inner laminate portion including a release layer at least partially in contact with the pressure sensitive adhesive layer. The inner laminate portion defines an inner die cut, the inner die cut extending across a region of the inner laminate to define an inner flap portion. The inner flap portion is at least partially connected to the packaging laminate. The outer flap portion overlies the inner flap portion and is secured thereto to form a flap at least partially connected to the packaging laminate. The outer die cut and the inner die cut defines (i) a flap resealing area in the flap extending between the outer die cut and the inner die cut, a portion of the pressure sensitive adhesive layer being selectively exposed in the flap resealing area, and (ii) a flap receiving area in the packaging laminate extending between the outer die cut and the inner die cut. A portion of the release layer being selectively exposed in the flap receiving area. The flap is selectively positionable between (i) a seal position in which the pressure sensitive adhesive layer in the flap resealing area of the flap is in contact with the release layer in the flap receiving area of the packaging laminate, and (ii) an open position in which the flap is at least partially spaced from the packaging laminate to thereby expose at least a portion of the pressure sensitive adhesive layer in the flap resealing area of the flap and a portion of the release layer in the flap receiving area of the packaging laminate. The outer laminate portion further includes an outer layer adjacent the pressure sensitive adhesive layer, and the inner laminate portion further includes an inner sealing layer, and a filmic layer disposed between the inner sealing layer and the release layer. The outer layer and the filmic layer exhibit a two dimensional vector delta CTE (or CTS) value Q of less than 1,000 µm/m ° C.

As will be realized, the invention is capable of other and different embodiments and its several details are capable of modifications in various respects, all without departing from the invention. Accordingly, the drawings and description are to be regarded as illustrative and not restrictive.

DETAILED DESCRIPTION OF THE EMBODIMENTS

Figure 1:
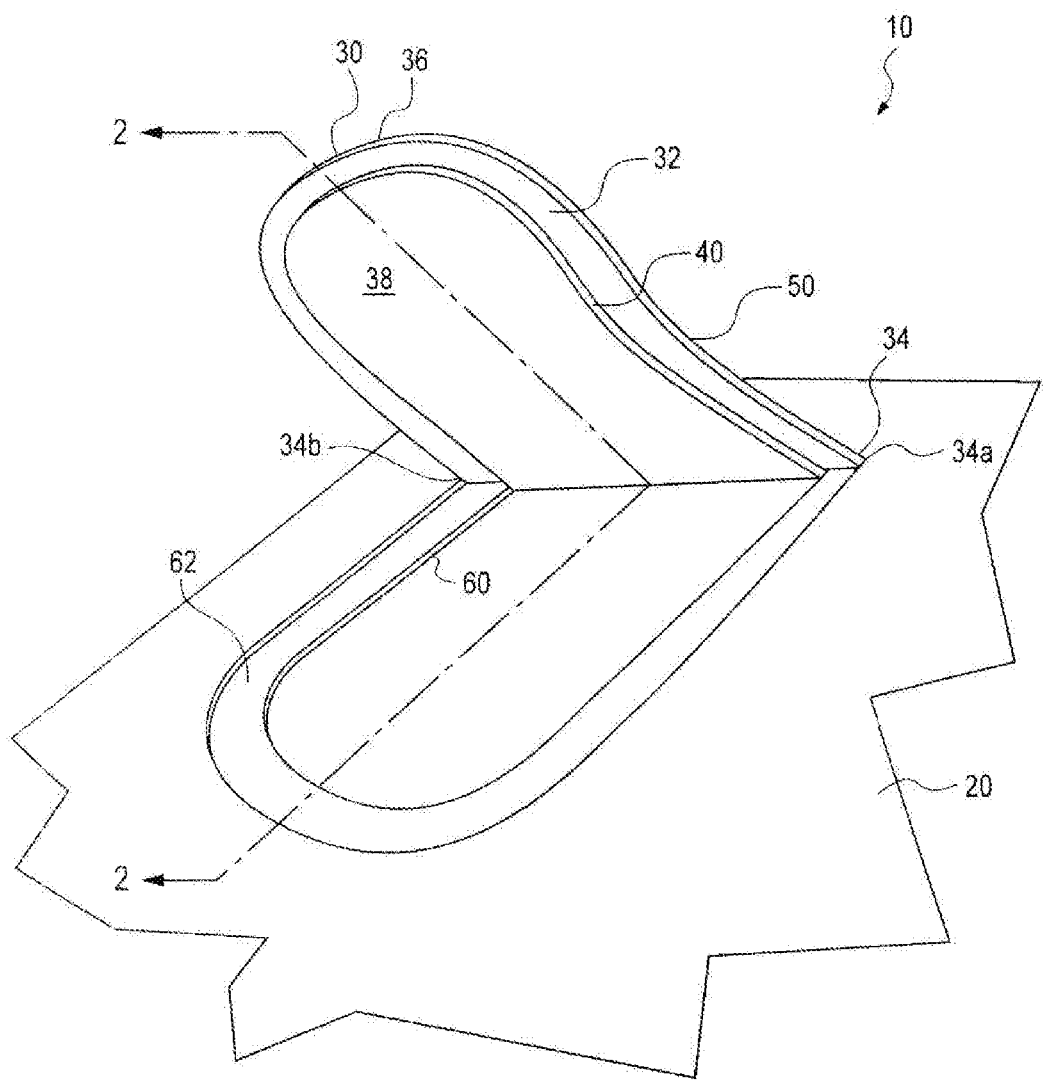
FIG. 1 is a schematic view illustrating a preferred embodiment resealable packaging laminate and positionable flap in accordance with the present invention.

The present invention provides a resealable package assembly optionally having high barrier properties, which is relatively simple in construction and manufacture, and which can be readily initially opened and securely resealed. The present invention also provides a laminate assembly with a resealable flap that can be used in a wide array of packaging applications. The packaging assemblies and laminates described herein are particularly useful in forming heat sealed, flexible wall, disposable bag or bag-like containers which are resealable.

A significant feature of the present invention is the incorporation of a release layer within the multilayer laminate, and preferably immediately adjacent to a pressure sensitive adhesive layer. As explained in greater detail herein, the use of a release layer in the laminate and particularly in a corresponding flap member, significantly reduces the amount of force otherwise required to initially open a sealed container. This feature promotes ease of use of a package system using the preferred laminate and flap configuration. The incorporation of a release layer in conjunction with particular cut lines as described herein also provides a designated rupture or separation interface between portions of the laminate during initial opening of a sealed package or container. The provision of such a separation interface significantly reduces the occurrence of tearing or unintended severing of the laminate, thereby preserving the sealing integrity of the package. These and other advantages of the preferred embodiment laminates, flap configurations, and package assemblies are described in greater detail herein.

The packaging laminates as described herein generally comprise a plurality of layers, such as from 2 to 12 or more, and preferably from 5 to 7. Generally, the laminates include an outer layer, an optional barrier layer, a pressure sensitive adhesive layer, a release layer, a filmic layer, and a sealing layer. An optional cover printing layer may also be included. The layers may be in a variety of different arrangements, however typically the outer layer provides an outer face for the packaging laminate and the sealing layer provides an inner face for contacting and sealing. The pressure sensitive layer and the release layer are preferably immediately adjacent to one another to provide a reseal function as described herein. The optional barrier layer is typically disposed adjacent the outer layer, but the present invention includes laminates in which the barrier layer is located elsewhere. Similarly, the filmic layer can be located at nearly any location in the laminate, however is typically located adjacent to the sealing layer.

In accordance with the present invention, a unique configuration and method of forming is provided for a selectively positionable and resealable flap member. The term "flap" as used herein refers to a portion of the laminate, such as a portion of a side wall when the laminate is used to form a container or package, that is partially severed from a remainder portion of the laminate so that the portion is selectively positionable with respect to the remainder portion. The flap portion remains connected to the remainder portion as described in greater detail herein.

The various preferred flaps can be readily formed in a rapid and economical manner. In accordance with the invention, a unique combination of cuts, incisions, or the like, formed in certain layers of the laminates enables inexpensive manufacture of resealable openings for packages.

In accordance with other features of the present invention, various tabs for the flaps are provided which facilitate opening and grasping of the flaps. Another feature described herein serves to reduce the extent of adhesive engagement between a flap and a corresponding receiving surface.

The present invention also provides various tamper identifiers. The tamper identifiers provide indication that the package, flap, or laminate has been initially opened. These and other aspects are all described in greater detail herein.

Outer Layer

The preferred multilayer laminate includes an outer substrate to provide support for the flap and packaging side wall and particularly for an outermost portion of the flap resulting from initial opening of the container and thus at least partial separation of the flap from the side wall. The outer substrate can be formed from a wide array of materials such as polyolefin film materials or paper, cardboard, or other paper-based materials. Representative materials for the outer substrate include, but are not limited to, polyethylene (PE), polypropylene (PP), both oriented and nonoriented, and co-extruded with or without copolymers thereof. Depending upon the particular end use application, another example of a potentially suitable film for the cover outer substrate is a layer of polyvinyl chloride (PVC) and copolymers thereof. Additional materials include, but are not limited to, polyethylene terephthalate (PET), oriented polypropylene (OPP), polyvinyl chloride (PVC), and ortho-phthalaldehyde (OPA). For many applications, PET is preferred.

The outer substrate or layer can be utilized at various thicknesses in the laminate. The outer substrate can have a typical thickness of from about 12 to about 60 microns, and a preferred thickness of from about 12 to about 25 microns.

Since the outer face of the outer substrate will likely constitute the outermost surface of the flap or side wall, it is desirable that the material selected for the outer substrate, at least along this outwardly directed face, exhibit attractive printability characteristics.

Printability is typically defined by the sharpness and brightness of the image and by ink anchorage. The sharpness is closely related to the surface tension of the print surface. The ink anchorage is often tested by a tape test (Finat test: FTM21). In general, PVC is printable with a variety of inks intended to be used with PVC. In most occasions the inks are water-based (especially in the US) or designed for UV drying (especially in Europe). In general, all polyolefin films can be printed with UV inks after on-press corona treatment, PE being better than PP mainly on ink adhesion. For waterbased inks an additional primer or topcoat is preferred to achieve good ink anchorage.

As explained herein, the flap or side wall of the laminate may include an optional printing layer disposed on an outer face of the outer substrate.

Barrier Layer

The preferred multilayer laminate includes an optional barrier material layer to promote the sealing characteristics of the flap and side wall and resulting sealed flap and side wall assembly. Typically, it is desirable for the barrier material to exhibit resistance to oxygen and/or water vapor transport or diffusion through the material. This is particularly desirable for sealing applications involving certain foods. A wide range of barrier materials can be used for the barrier material layer. The selection of the barrier material(s) is largely dictated by the degree of sealing required and hence, by the contents for which the sealing assembly is to house. Representative materials for use in the barrier material layer include, but are not limited to, polyvinyl alcohol (PVOH, PVA) and ethylene vinyl alcohol (EVOH) polymers. A well known and preferred barrier material is polyvinylidene chloride (PVDC). It is also contemplated that nylon and various nylon-based polymers known in the art could be used. Various metalized layers such as using aluminum can be used. It is further contemplated that combinations of these materials could be used, and in particular, multiple films of these materials could be utilized. An excellent discussion of barrier materials and their characteristics is provided in US Patent Application Publication 2004/0033379, owned by the assignee of the present application. Preferred materials for the barrier material include PVDC, EVOH, and combinations thereof. Another preferred material for the barrier material is a metalized aluminum layer.

The barrier material is typically utilized at relatively small thicknesses in the preferred cover laminate. For example, the barrier material layer thickness is preferably from about 0.4 to about 6 microns, more preferably from about 1 to about 5 microns, and more preferably from about 1 to about 3 microns in thickness.

As noted, preferably the barrier material exhibits a relatively low oxygen and/or water permeability. Most preferably, the oxygen permeability is zero. A preferred maximum oxygen permeability is approximately 50 $cc/m^2/24$ hours. A preferred maximum water permeability is approximately 50 $cc/m^2/24$ hours.

For certain applications, it is contemplated that the laminate of the present invention can be free of a barrier layer. However, the preferred embodiment includes a barrier layer. Thus, the barrier layer is described as being optional.

In certain applications, it may be preferred to utilize a barrier material such as PVDC or metalized aluminum along an outermost face of the filmic or outer layer. Without such barrier layer, the oxygen transmission rate or water transmission rate will be relatively high with respect to the outer face of one or more layers in the laminate. As explained in greater detail herein, after forming a cut or incision to an adhesive layer in the laminate, barrier properties typically decrease along the cut region. Thus, incorporation of a barrier material in the laminate can improve barrier properties of the cut laminate.

Moreover if the present invention laminate and packaging assembly is to be used for perishable products that require a controlled atmosphere, an oxygen barrier layer is preferably used at multiple locations within the laminate. For non-perishable products there will likely be no need for such barrier.

Pressure Sensitive Adhesive Layer

The preferred multilayer laminate includes a pressure sensitive adhesive (PSA) layer. The pressure sensitive adhesive provides a tacky surface allowing a bond to another contacting surface. Preferably, the properties of the pressure sensitive adhesive are such that the bond also provides a seal to prevent or at least significantly prevent the flow of air or other agents across the region of the pressure sensitive adhesive.

A wide range of pressure sensitive adhesives can be used in this layer so long as their properties and characteristics are consistent with the packaging requirements of the resulting assembly. The pressure sensitive adhesive could be a hot melt pressure sensitive adhesive, such as for example a rubber-based or acrylic-based pressure sensitive adhesive. The pressure sensitive adhesive could be a UV cured hot melt. The pressure sensitive adhesive could be based on a rubber-based hot melt composition, a solvent rubber adhesive, a solvent acrylic adhesive, or a solvent polyurethane adhesive. The pressure sensitive adhesive could be emulsion-based such as an emulsion acrylic adhesive. As noted, a wide array of pressure sensitive adhesives could be used. An extensive selection of various pressure sensitive adhesives are disclosed in U.S. Pat. Nos. 5,623,011; 5,830,571; and 6,147,165; owned by the assignee of the present application.

A preferred pressure sensitive adhesive for use in the pressure sensitive adhesive layer is commercially available under the designation Fasson® S692N. The S692N adhesive is an acrylic emulsion based adhesive. Generally, this adhesive is a polymeric blend of butyl acrylate and 2-ethyl-hexyl acrylate monomers with various tackifiers and processing acids. Other preferred pressure sensitive adhesives include, but are not limited to, emulsion acrylic adhesives and rubber-based hot melt adhesives.

The thickness of the pressure sensitive adhesive layer typically ranges from about 12 to about 40 microns and preferably from about 12 to about 20 microns. It will be understood however, that the present invention includes laminates using thicknesses greater than or lesser than these thicknesses for the pressure sensitive adhesive layer.

Release Layer

The preferred multilayer laminate includes a release layer. Preferably, the release layer is disposed immediately adjacent to the pressure sensitive adhesive layer in the laminate. Most preferably, the release layer is disposed between the pressure sensitive adhesive layer and the inner sealing layer, and preferably between the pressure sensitive adhesive layer and the filmic layer. The release layer provides a release surface which, as previously noted, is immediately adjacent to, and in contact with, the pressure sensitive adhesive layer.

A wide variety of release materials such as those typically used for pressure sensitive tapes and labels are known, including silicones, alkyds, stearyl derivatives of vinyl polymers (such as polyvinyl stearyl carbamate), stearate chromic chloride, stearamides and the like. Fluorocarbon polymer coated release liners are also known but are relatively expensive. A film skin layer can be modified by adding one or more slip agent(s) including a silicone type slip agent during the film co-extruding process. The release layer can be provided by the slip agent modified film skin layer. More particularly, the release layer can be in the form of a silicone slip agent modified co-extruded polypropylene film skin layer. For most pressure sensitive adhesive applications, silicones are by far the most frequently used materials. Silicone release coatings have easy release at both high and low peel rates, making them suitable for a variety of production methods and applications.

Known silicone release coating systems consist of a reactive silicone polymer, e.g., an organopolysiloxane (often referred to as a "polysiloxane," or simply, "siloxane"); a cross-linker; and a catalyst. After being applied to the adjacent layer or other substrate, the coating generally must be cured to cross-link the silicone polymer chains, either thermally or radiatively (by, e.g., ultraviolet or electron beam irradiation).

Based on the manner in which they are applied, three basic types of silicone release coatings used in the pressure sensitive adhesive industry are known: solventborne, waterborne emulsions, and solvent free coatings. Each type has advantages and disadvantages. Solventborne silicone release coatings have been used extensively but, because they employ a hydrocarbon solvent, their use in recent years has tapered off due to increasingly strict air pollution regulations, high energy requirements, and high cost. Indeed, the energy requirements of solvent recovery or incineration generally exceed that of the coating operation itself.

Waterborne silicone emulsion release systems are as well known as solvent systems, and have been used on a variety of pressure sensitive products, including tapes, floor tiles, and vinyl wall coverings. Their use has been limited, however, by problems associated with applying them to paper substrates. Water swells paper fibers, destroying the dimensional stability of the release liner backing and causing sheet curling and subsequent processing difficulties.

Solventless silicone release coatings have grown in recent years and now represent a major segment of the silicone release coating market. Like other silicone coatings, they must be cured after being applied to the flexible liner substrate. Curing produces a cross-linked film that resists penetration by the pressure sensitive adhesive.

Informative descriptions of various release materials, their characteristics, and incorporation in laminate assemblies are provided in U.S. Pat. Nos. 5,728,469; 6,486,267; and US Published Patent Application 2005/0074549, owned by the assignee of the present application. It is also contemplated that various waxes known in the art could be used for the release material or utilized in the release layer.

The preferred laminates utilize release layers that are relatively thin. For example, a typical release layer thickness is from about 1 to about 4 microns. Preferably, the thickness of the release layer is from about 1 to about 2 microns.

Filmic Layer

The preferred multilayer laminate includes a filmic layer or inner substrate. The inner substrate provides support for the flap and side wall laminate and particularly for the layers disposed adjacent to the inner substrate. Representative materials for the inner substrate include those noted herein for the outer substrate. In addition, it may be preferred to utilize a co-extruded biaxially-oriented polypropylene (BOPP) material. These materials provide cost savings as they are relatively inexpensive, and they have sufficient stiffness to dispense well and support out layer resealing. Another preferred material for use in the inner substrate layer is co-extruded biaxially-oriented polyethylene terephthalate (BOPET). It is contemplated that oriented or non-oriented versions of films could be used. The previously noted PVC and OPA polymeric materials may also be suitable for use in this layer.

The inner substrate thickness typically ranges from about 12 to about 60 microns, and preferably from about 12 to about 25 microns. The present invention includes the use of thicknesses greater than or lesser than these thicknesses.

Sealing Layer

The preferred multilayer laminate includes a heat sealing layer. Preferably, the heat sealing layer is disposed along the underside or inner face of the laminate that contacts a corresponding face of the container upon thermal bonding one portion of the laminate to another portion of the laminate.

The heat sealing layer is a layer which is activated by heat to allow the layer to bond to a plastic substrate. Materials for the heat sealing layer include, but are not limited to, the following film-forming materials used alone or in combination such as polyethyelene, metallocene catalyzed polyolefins such as for example copolymers of polypropylene (Co-PP) or terpolymers of polypropylene (Ter-PP), syndiotactic polystyrene, syndiotactic polypropylene, cyclic polyolefins, polyethylene methyl acrylic acid, polyethylene ethyl acrylate, polyethylene methyl acrylate, acrylonitrile butadiene styrene polymer, polyethylene vinyl alcohol, polyethylene vinyl acetate, nylon, polybutylene, polystyrene, polyurethane, polysulfone, polyvinylidene chloride, polypropylene, polycarbonate, polymethyl pentene, styrene maleic anhydride polymer, styrene acrylonitrile polymer, ionomers based on sodium or zinc salts of ethylene/methacrylic acid, polymethyl methacrylates, cellulosics, fluoroplastics, polyacrylonitriles, and thermoplastic polyesters. Other contemplated materials for the heat sealing layer include, but are not limited to, glycol-modified polyethylene terephthalate (PETG), which is particularly well suited for use when one or more other substrates are formed from polyethylene terephthalate (PET). Preferably, PE is used in the heat sealing layer, more preferably, a blend of PE and EVA, such as for example, a blend of PE and EVA with special antiblock and antistatic additives. A preferred material for use in the heat sealing layer is glycol-modified polyethylene terephthalate (PETG). Additional preferred materials for use in the heat sealing layer include Co-PP or Ter-PP. A most preferred material for the heat sealing layer is linear low density polyethylene (LLDPE).

The thickness of the heat sealing layer may vary according to requirements of the packaging assembly. Typical thicknesses of this layer are from about 15 to about 90 microns and preferably from about 30 to about 60 microns. When utilizing a co-extruded film skin layer, the skin layer is typically about 1.5 microns in thickness.

The heat sealing layer is designed to be activated at temperatures known to those skilled in the art. While the heat sealing layer may activate at temperatures below those specified for activation, the heat sealing layer is designed to activate at certain temperatures based on the substrate material. Preferably, the heat sealing layer activates at temperatures between about 90° C. to about 160° C., more preferably from about 100° C. to about 150° C., more preferably the heat sealing layer activates at temperatures between about 110° C. to about 140° C., and most preferably the heat sealing layer activates at temperatures between about 120° C. to about 130° C. Contact times are relatively fast, such as from about 0.1 seconds to about 5 seconds, and typically about 2 seconds. Preferably, pressure is also applied to the respective surfaces during heat sealing.

Cover Printing Layer

An optional printing layer may be disposed on the previously described outer substrate. The printing layer serves to receive and retain one or more inks deposited on the printing layer. The ink(s) constitute indicia or other markings for the cover laminate and package assembly. The printing layer can be formed from a wide range of materials typically known to those skilled in the art. For example, a variety of polyvinyl alcohol (PVA) and cellulose-based materials can be used for the printing layer.

The printing layer typically ranges from about 3 to about 20 microns in thickness and preferably, from about 3 to about 8 microns in thickness.

Preferred Aspects of the Flap and Laminate Body or Side Wall

Another significant feature of the preferred embodiment laminate and resulting containers and packaging, is the provision of one or more cuts, scores, or slits in certain layers. The cut, score or slit can be formed in the laminate in a variety of ways, however, a preferred method is to die cut the slit through particular layers such as the sealing layer, inner substrate, and release layer. In other layers, it is preferred to form the cut, score or slit through the outer layer and the adhesive layer. Preferably, these cuts are formed by die cutting. These aspects are described in greater detail herein. This combination of cuts forms the unique flap and sealing configuration.

It is also contemplated that by not forming the cut, score or slit in select regions of the cover laminate, a hinge or bridging portion for the flap can be provided. Thus, for example, one or more cuts could be provided in a laminate along three of four sides of a rectangular shaped pattern. The portion of the laminate free of the cut would then serve as a hinge for the resulting flap upon initial and later openings of the package.

Another reason for the preferred provision of the cuts, scores or slits in the noted layer(s) of the cover laminate, is that such cuts enable control of the contact surface area between the pressure sensitive adhesive layer and the release layer. The ability to readily control the amount, configuration, and shape of the contact area enables direct control over the resealing strength between the outer separable portion of the laminate and the inner separable portion of the laminate. As will be appreciated, for applications in which greater resealing strength is desired, the contact area can be readily increased during design and/or manufacturing. And for applications in which less resealing strength is desired, the contact area can be easily reduced in design and/or manufacturing.

Another preferred aspect of the preferred embodiment cover laminate is that by appropriate selection of the materials that the pressure sensitive adhesive contacts, i.e. the material layers disposed immediately adjacent to the pressure sensitive adhesive in the cover laminate, the surface energy of the exposed face of each material layer can be tailored to provide desired sealing characteristics such as particular resealing strengths. For example, if a low resealing strength is desired, a release material having a relatively low surface energy such as a silicone release material could be used immediately adjacent to the pressure sensitive adhesive layer. Furthermore, selection and arrangement of appropriately engineered materials for use in the layers immediately adjacent to the pressure sensitive adhesive could be used to achieve differences in tack to ensure or at least promote, retention of the adhesive with one layer as compared to another layer. For example, by appropriate selection and use of materials for the release layer and the layer disposed on an opposite face of the pressure sensitive adhesive layer, retention of the adhesive with the outer separable cover portion as opposed to remaining on the inner cover portion bonded to the container can be achieved.

Specifically, in accordance with the present invention, the level of adhesion between the pressure sensitive adhesive and one or more layer(s) immediately adjacent the adhesive, e.g. the release layer, is controlled. The level of adhesion is preferably controlled by (i) the use of a release layer disposed immediately adjacent to the pressure sensitive adhesive layer and most preferably disposed between the adhesive layer and the inner substrate in the cover laminate; (ii) the configuration and surface area of the release layer exposed after initial opening of the cover; (iii) appropriate selection of release materials and/or materials having desired surface energies used in the release layer; (iv) appropriate selection of other materials in the cover laminate, namely the pressure sensitive adhesive material and the material of the layer disposed immediately adjacent the face of the pressure sensitive adhesive opposite that of the release layer; (v) the configuration and surface area of the pressure sensitive adhesive material exposed after initial opening of the cover; and (vi) the thickness of the pressure sensitive adhesive layer.

By controlling the level of adhesion, preferably by one or more, or all of factors (i)-(vi), the pressure sensitive adhesive layer can be more reliably retained with the outer separable portion of the cover.

It is preferred that particular tack and peel characteristics exist with regard to the pressure sensitive adhesive and the layers disposed on opposite sides or faces of the pressure sensitive adhesive layer. It is desirable that a difference regarding these characteristics exists between the two layers on opposite sides of the pressure sensitive adhesive layer. Specifically, it is desired that a particular minimum difference exists between the tack and peel characteristics associated with (i) the pressure sensitive adhesive and the layer immediately adjacent to one face of the adhesive, and (ii) the pressure sensitive adhesive and the layer immediately adjacent to an opposite face of the adhesive.

For a cover laminate utilizing a pressure sensitive adhesive layer disposed between an inner substrate of co-extruded biaxially oriented polypropylene (BOPP) and an outer substrate of polyethylene terephthalate (PET), it is preferred that the difference in tack and peel characteristics between these two substrates and a respective face of the pressure sensitive adhesive, be at least 1.5 N/in and preferably at least 3.0 N/in. The greater adhesive bond preferably exists between the outer substrate and a corresponding face of the pressure sensitive adhesive as compared to the adhesive bond existing between the inner substrate and an opposite face of the pressure sensitive adhesive.

Appropriate selection of the pressure sensitive adhesive and the release layer material primarily governs the force needed to initially open a sealed container, and also the amount of force necessary for subsequent opening operations after an initial opening. This force, referred to as the "opening force," is the force that a consumer must exert upon the cover in order to separate the cover laminate into its respective portions and thereby open the container. Typically, to provide a relatively easy to open container, the opening force should be less than 10 N/in. Also, it is desirable that some minimum force be necessary so as to prevent unintended openings of the container. Thus, typically, a minimum force of at least 1 N/in to about 2 N/in and preferably greater than 3 N/in is targeted. For many applications, it is preferred that a reseal force of from about 1 N/in to about 2 N/in be provided.

Yet another preferred aspect is the provision of one or more tabs that facilitate grasping and/or opening a flap. The tabs are preferably formed during formation of an outer die cut, and extend through several outer layers of the laminate such as the outer layer and the pressure sensitive adhesive layer. The tabs may be in a variety of different shapes depending upon the end use requirements of the laminate and/or packaging assembly.

In the event that a tab is used in conjunction with a flap, it is preferred to use an adhesive deadening material between the underside of the flap and/or tab and the corresponding release layer facing the flap and/or tab. A wide array of materials can be used as the adhesive deadening material such as non-volatile hydrocarbons and non-stick polymeric compounds. An example of such a material is a non-toxic varnish or oily material.

A further preferred aspect of the resealable flaps and laminates is the provision of one or more tamper identifiers. These provisions provide a visual indication of whether the flap has been previously opened. A preferred form of a tamper identifier is the provision of one, two, or more small non-continuous uncut segments within the die cuts, and particularly within an outer die cut as explained herein.

Upon initially opening the flap to gain access into a package, the one or more non-continuous uncut segments are severed or torn to thereby indicate occurrence of an initial opening operation. Another preferred form of a tamper identifier is the provision of one or more cut shapes within a reseal region of the flap. Upon initially opening the flap, the cut shapes remain with the body of the package and a corresponding number of apertures result in the flap. These apertures and subsequent mis-alignment between the cut shapes and the apertures provide another indication of an initial flap opening having occurred.

In a particularly preferred embodiment, a multilayer laminate is provided comprising at least two polymeric films having a layer of a pressure sensitive adhesive disposed between the polymeric films. The materials for the two polymeric films are preferably selected such that they exhibit particular physical characteristics relative to one another. Specifically, the physical characteristics relate to the coefficient of thermal expansion (CTE) for each of the film materials. Generally, the term "coefficient of thermal expansion" is the ratio of a material's increased dimension at one temperature to the material's original dimension, upon a temperature change of 1° C. Since nearly all materials expand upon heating, the material's increased dimension occurs after heating the material. Similarly, another term, "coefficient of thermal shrinkage" (CTS), refers to the ratio of a material's reduced dimension at one temperature to the material's original dimension upon a temperature change of 1° C.

The terms "delta CTE" or "delta CTS" (also denoted as $\Delta$CTE or $\Delta$CTS) refer to the absolute difference between two CTE values (or CTS values) for two materials. It is important when determining a delta CTE (or delta CTS) value, to always compare CTE (or CTS) values which are taken with regard to the same material orientation or direction. For example, films are known which exhibit different degrees or extents of shrinkage depending upon whether the shrink is measured in a machine direction (MD) or a cross direction (CD). Thus, when determining a machine direction delta CTE (also denoted as MD $\Delta$CTE) value from two CTE values for films, it is important to compare the machine direction CTE (MD CTE) value for one film with the machine direction CTE (MD CTE) value for the other film. Similarly, when determining a cross direction delta CTE (also denoted as CD $\Delta$CTE) value from two CTE values for films, it is important to compare the cross direction CTE (CD CTE) value for one film with the cross direction CTE (CD CTE) value for the other film. This same practice applies when determining machine direction delta CTS values and cross direction delta CTS values.

In accordance with the present invention, it has been discovered that improved sealing efficacy and other benefits result when a multilayer laminate having a pair of polymeric films separated by a layer of pressure sensitive adhesive exhibits a two dimensional vector delta CTE (or CTS) value (periodically referred to herein as "Q") of less than 1,000 μm/m ° C., preferably less than 500 μm/m ° C., and most preferably less than 100 μm/m ° C. The two dimensional vector delta CTE (or CTS) value, "Q" is determined by the following formula (I):

$$Q = [(MD\Delta CTE)^2 + (CD\Delta CTE)^2]^{1/2} \qquad (I)$$

As evident from a review of the formula (I), the value Q is a function of the delta CTE as measured in a machine direction and the delta CTE as measured in a cross direction. Specifically, Q is the square root of the sum of the squared value of the machine direction delta CTE for two films and the squared value of the cross direction delta CTE for the same two films. The Q value is thus based upon two different materials. And, the Q value is also based upon the delta CTE values taken in the machine direction and the cross direction of the same two films. It will be appreciated that a Q value based upon CTS values can also be readily determined.

A collection of four polymeric films was evaluated and the following data provides additional insight into identifying a pair of films that satisfy the preferred Q values. Tables 1-4 set forth below list dimensional changes (Table 1), coefficient of thermal expansion (CTE) values (Table 2), delta CTE values (Table 3), and Q values (Table 4) for four samples of polymeric films, designated as samples A-D. Sample A is a polyethylene terephthalate (PET) film. Sample B is another grade of a PET film. Sample C is still another grade of a PET film. Sample D is a biaxially oriented polypropylene film.

Specifically, samples formed from each of the films A-D were heated from 0° C. to 155° C. and their change in dimension in a machine direction (MD) and in a cross direction (CD) recorded every 5° C. Typically, samples can be heated at a rate of 10° C./minute in a thermomechanical analyzer using a load of 0.05 N, such as a Q400 system available from TA Instruments of New Castle, Del.

TABLE 1

Dimensional Changes

| | Dimension Change | | | | | | | |
|---|---|---|---|---|---|---|---|---|
| | Sample A MD | Sample A CD | Sample B MD | Sample B CD | Sample C MD | Sample C CD | Sample D MD | Sample D CD |
| | | | | Sample Length(μm) | | | | |
| Temperature ° C. | 16008.4 μm/° C. | 16020.8 μm/° C. | 15961.6 μm/° C. | 16015.5 μm/° C. | 16019.1 μm/° C. | 16024.2 μm/° C. | 15972 μm/° C. | 16024 μm/° C. |
| 0 | 0 | 0 | 0 | 0 | 0 | 0 | 0 | 0.4937 |
| 5 | 0.143 | 0.1135 | 0.5828 | 0.3894 | 0.2171 | 0.141 | 0.8559 | 0.5178 |
| 10 | 0.1848 | 0.1751 | 0.7317 | 0.4981 | 0.3196 | 0.248 | 1.145 | 0.5631 |
| 15 | 0.2133 | 0.2062 | 0.7961 | 0.5264 | 0.3554 | 0.2978 | 1.432 | 0.5931 |
| 20 | 0.2262 | 0.227 | 0.8299 | 0.5027 | 0.3819 | 0.3291 | 1.684 | 0.595 |
| 25 | 0.2368 | 0.246 | 0.8518 | 0.4613 | 0.3972 | 0.3477 | 1.692 | 0.5888 |
| 30 | 0.2337 | 0.2668 | 0.8618 | 0.4149 | 0.4014 | 0.3644 | 1.659 | 0.4372 |
| 35 | 0.2314 | 0.284 | 0.8013 | 0.3823 | 0.4129 | 0.3695 | 1.896 | 0.3506 |
| 40 | 0.2394 | 0.2902 | 0.7111 | 0.4064 | 0.4248 | 0.3754 | 2.181 | 0.3997 |
| 45 | 0.2434 | 0.2905 | 0.7138 | 0.3415 | 0.4287 | 0.3726 | 2.304 | 0.461 |
| 50 | 0.2391 | 0.2821 | 0.7519 | 0.2572 | 0.4259 | 0.3677 | 2.434 | 0.4809 |
| 55 | 0.2353 | 0.2672 | 0.7177 | 0.1934 | 0.4266 | 0.3611 | 2.629 | 0.5269 |
| 60 | 0.2337 | 0.2613 | 0.6807 | 0.2277 | 0.414 | 0.3621 | 2.924 | 0.5786 |
| 65 | 0.2336 | 0.2665 | 0.653 | 0.2327 | 0.3972 | 0.3661 | 3.402 | 0.6079 |
| 70 | 0.2396 | 0.2812 | 0.6163 | 0.2333 | 0.3655 | 0.355 | 4.006 | 0.6368 |
| 75 | 0.2379 | 0.2977 | 0.569 | 0.2386 | 0.3626 | 0.3577 | 4.409 | 0.717 |
| 80 | 0.2457 | 0.3149 | 0.519 | 0.2492 | 0.5093 | 0.3826 | 4.353 | 0.8386 |
| 85 | 0.2221 | 0.3603 | 0.4759 | 0.2841 | 0.4069 | 0.4524 | 4.213 | 0.9178 |
| 90 | 0.07155 | 0.4543 | 0.4363 | 0.3748 | 0.3266 | 0.5844 | 3.816 | 0.944 |
| 95 | −0.1105 | 0.6095 | 0.3667 | 0.5467 | 0.2579 | 0.7604 | 3.22 | 1.169 |
| 100 | −0.6011 | 0.8104 | 0.2475 | 0.7338 | 0.3449 | 0.9446 | 2.379 | 1.217 |
| 105 | −1.235 | 1.058 | 0.08294 | 0.9615 | −0.1588 | 1.12 | 1.222 | 1.012 |
| 110 | −1.686 | 1.263 | −0.1013 | 1.223 | −0.6055 | 1.249 | −0.4861 | 1.067 |
| 115 | −1.704 | 1.367 | −0.3764 | 1.478 | −0.5493 | 1.1 | −3.108 | 0.6287 |
| 120 | −1.568 | 1.441 | −0.9711 | 1.559 | −0.2968 | 1.096 | −6.384 | −1.075 |
| 125 | −1.391 | 1.516 | −1.2 | 1.336 | −0.371 | 1.209 | −8.705 | −4.046 |
| 130 | −1.243 | 1.581 | −0.771 | 1.235 | −0.298 | 1.278 | −8.626 | −6.789 |
| 135 | −1.156 | 1.628 | −0.2197 | 1.536 | −0.1432 | 1.264 | −7.932 | −10.24 |
| 140 | −1.131 | 1.675 | −0.0993 | 1.957 | −0.2013 | 1.212 | −10.59 | −16.23 |
| 145 | −1.174 | 1.719 | −0.6278 | 2.314 | −0.2599 | 1.236 | −15.37 | −27.15 |
| 150 | −1.278 | 1.793 | −1.573 | 2.223 | −0.2706 | 1.315 | −17.47 | −42.19 |
| 155 | −1.401 | 1.87 | −2.093 | 2.288 | −0.6101 | 1.167 | −21.13 | −59.73 |

Then, the coefficient of thermal expansion (CTE) for each of the samples was determined for both machine direction and cross direction every 5° C. The CTE values are noted in Table 2.

TABLE 2

Coefficient of Thermal Expansion (CTE)

| | CTE(μm/m° C.) | | | | | | | |
|---|---|---|---|---|---|---|---|---|
| Temperature ° C. | Sample A MD | Sample A CD | Sample B MD | Sample B CD | Sample C MD | Sample C CD | Sample D MD | Sample D CD |
| 0 | 0.00 | 0.00 | 0.00 | 0.00 | 0.00 | 0.00 | 0.00 | 30.81 |
| 5 | 8.93 | 7.08 | 36.51 | 24.31 | 13.55 | 8.80 | 53.59 | 32.31 |
| 10 | 11.54 | 10.93 | 45.84 | 31.10 | 19.95 | 15.48 | 71.69 | 35.14 |

TABLE 2-continued

Coefficient of Thermal Expansion (CTE)

CTE(μm/m° C.)

| Temperature ° C. | Sample A MD | Sample A CD | Sample B MD | Sample B CD | Sample C MD | Sample C CD | Sample D MD | Sample D CD |
|---|---|---|---|---|---|---|---|---|
| 15 | 13.32 | 12.87 | 49.88 | 32.87 | 22.19 | 18.58 | 89.66 | 37.01 |
| 20 | 14.13 | 14.17 | 51.99 | 31.39 | 23.84 | 20.54 | 105.43 | 37.13 |
| 25 | 14.79 | 15.36 | 53.37 | 28.80 | 24.80 | 21.70 | 105.94 | 36.74 |
| 30 | 14.60 | 16.65 | 53.99 | 25.91 | 25.06 | 22.74 | 103.87 | 27.28 |
| 35 | 14.45 | 17.73 | 50.20 | 23.87 | 25.78 | 23.06 | 118.71 | 21.88 |
| 40 | 14.95 | 18.11 | 44.55 | 25.38 | 26.52 | 23.43 | 136.55 | 24.94 |
| 45 | 15.20 | 18.13 | 44.72 | 21.32 | 26.76 | 23.25 | 144.25 | 28.77 |
| 50 | 14.94 | 17.61 | 47.11 | 16.06 | 26.59 | 22.95 | 152.39 | 30.01 |
| 55 | 14.70 | 16.68 | 44.96 | 12.08 | 26.63 | 22.53 | 164.60 | 32.88 |
| 60 | 14.60 | 16.31 | 42.65 | 14.22 | 25.84 | 22.60 | 183.07 | 36.11 |
| 65 | 14.59 | 16.63 | 40.91 | 14.53 | 24.80 | 22.85 | 213.00 | 37.94 |
| 70 | 14.97 | 17.55 | 38.61 | 14.57 | 22.82 | 22.15 | 250.81 | 39.74 |
| 75 | 14.86 | 18.58 | 35.65 | 14.90 | 22.64 | 22.32 | 276.05 | 44.75 |
| 80 | 15.35 | 19.66 | 32.52 | 15.56 | 31.79 | 23.88 | 272.54 | 52.33 |
| 85 | 13.87 | 22.49 | 29.82 | 17.74 | 25.40 | 28.23 | 263.77 | 57.28 |
| 90 | 4.47 | 28.36 | 27.33 | 23.40 | 20.39 | 36.47 | 238.92 | 58.91 |
| 95 | −6.90 | 38.04 | 22.97 | 34.14 | 16.10 | 47.45 | 201.60 | 72.95 |
| 100 | −37.55 | 50.58 | 15.51 | 45.82 | 21.53 | 58.95 | 148.95 | 75.95 |
| 105 | −77.15 | 66.04 | 5.20 | 60.04 | −9.91 | 69.89 | 76.51 | 63.16 |
| 110 | −105.32 | 78.84 | −6.35 | 76.36 | −37.80 | 77.94 | −30.43 | 66.59 |
| 115 | −106.44 | 85.33 | −23.58 | 92.29 | −34.29 | 68.65 | −194.59 | 39.23 |
| 120 | −97.95 | 89.95 | −60.84 | 97.34 | −18.53 | 68.40 | −399.70 | −67.09 |
| 125 | −86.89 | 94.63 | −75.18 | 83.42 | −23.16 | 75.45 | −545.02 | −252.50 |
| 130 | −77.65 | 98.68 | −48.30 | 77.11 | −18.60 | 79.75 | −540.07 | −423.68 |
| 135 | −72.21 | 101.62 | −13.76 | 95.91 | −8.94 | 78.88 | −496.62 | −639.04 |
| 140 | −70.65 | 104.55 | −6.22 | 122.19 | −12.57 | 75.64 | −663.04 | −1012.86 |
| 145 | −73.34 | 107.30 | −39.33 | 144.49 | −16.22 | 77.13 | −962.31 | −1694.33 |
| 150 | −79.83 | 111.92 | −98.55 | 138.80 | −16.89 | 82.06 | −1093.79 | −2632.93 |
| 155 | −87.52 | 116.72 | −131.13 | 142.86 | −38.09 | 72.83 | −1322.94 | −3727.53 |

After determining CTE values for each set of samples for the films A-D, delta CTE values were then determined. Specifically, machine direction and cross direction delta CTE values were determined for samples A and B (denoted as ΔCTE for "Samples A/B"), samples A and C, and for samples A and D. These delta CTE values are set forth below in Table 3.

TABLE 3

Delta CTE Values
Δ CTE(μm/m° C.)

| Temperature ° C. | Samples A/B MD | Samples A/B CD | Samples A/C MD | Samples A/C CD | Samples A/D MD | Samples A/D CD |
|---|---|---|---|---|---|---|
| 0 | 0.00 | 0.00 | 0.00 | 0.00 | 0.00 | 30.81 |
| 5 | 27.58 | 17.23 | 4.62 | 1.71 | 44.65 | 25.23 |
| 10 | 34.30 | 20.17 | 8.41 | 4.55 | 60.14 | 24.21 |
| 15 | 36.55 | 20.00 | 8.86 | 5.71 | 76.33 | 24.14 |
| 20 | 37.86 | 17.22 | 9.71 | 6.37 | 91.30 | 22.96 |
| 25 | 38.57 | 13.45 | 10.00 | 6.34 | 91.14 | 21.39 |
| 30 | 39.39 | 9.25 | 10.46 | 6.09 | 89.27 | 10.63 |
| 35 | 35.75 | 6.14 | 11.32 | 5.33 | 104.25 | 4.15 |
| 40 | 29.60 | 7.26 | 11.56 | 5.31 | 121.60 | 6.83 |
| 45 | 29.52 | 3.19 | 11.56 | 5.12 | 129.05 | 10.64 |
| 50 | 32.17 | 1.55 | 11.65 | 5.34 | 137.46 | 12.40 |
| 55 | 30.27 | 4.60 | 11.93 | 5.86 | 149.90 | 16.20 |
| 60 | 28.05 | 2.09 | 11.25 | 6.29 | 168.47 | 19.80 |
| 65 | 26.32 | 2.10 | 10.20 | 6.21 | 198.41 | 21.30 |
| 70 | 23.64 | 2.99 | 7.85 | 4.60 | 235.85 | 22.19 |
| 75 | 20.79 | 3.68 | 7.77 | 3.74 | 261.18 | 26.16 |
| 80 | 17.17 | 4.10 | 16.45 | 4.22 | 257.19 | 32.68 |
| 85 | 15.94 | 4.75 | 11.53 | 5.74 | 249.90 | 34.79 |
| 90 | 22.86 | 4.95 | 15.92 | 8.11 | 234.45 | 30.55 |
| 95 | 29.88 | 3.91 | 23.00 | 9.41 | 208.51 | 34.91 |
| 100 | 53.06 | 4.77 | 59.08 | 8.36 | 186.50 | 25.36 |
| 105 | 82.34 | 6.00 | 67.23 | 3.86 | 153.66 | 2.88 |
| 110 | 98.97 | 2.47 | 67.52 | 0.89 | 74.89 | 12.25 |
| 115 | 82.86 | 6.96 | 72.15 | 16.68 | 88.15 | 46.09 |

TABLE 3-continued

Delta CTE Values
Δ CTE(μm/m° C.)

| Temperature ° C. | Samples A/B MD | Samples A/B CD | Samples A/C MD | Samples A/C CD | Samples A/D MD | Samples A/D CD |
|---|---|---|---|---|---|---|
| 120 | 37.11 | 7.40 | 79.42 | 21.55 | 301.75 | 157.03 |
| 125 | 11.71 | 11.21 | 63.73 | 19.18 | 458.12 | 347.12 |
| 130 | 29.34 | 21.57 | 59.04 | 18.93 | 462.42 | 522.36 |
| 135 | 58.45 | 5.71 | 63.27 | 22.74 | 424.41 | 740.66 |
| 140 | 64.43 | 17.64 | 58.08 | 28.92 | 592.38 | 1117.41 |
| 145 | 34.00 | 37.19 | 57.11 | 30.16 | 888.97 | 1801.63 |
| 150 | 18.72 | 26.89 | 62.94 | 29.85 | 1013.96 | 2744.84 |
| 155 | 43.61 | 26.14 | 49.43 | 43.90 | 1235.42 | 3844.26 |

After determining the various noted delta CTE values, Q values for each of the three film pairs were determined. Specifically, a Q value for films A and B, films A and C, and A and D were calculated and are set forth in Table 4.

TABLE 4

Two Dimensional Vector Delta CTE or Q Values
2 Dimensional Vector Δ CTE(μm/m° C.)

| Temperature ° C. | Samples A/B | Samples A/C | Samples A/D |
|---|---|---|---|
| 0 | 0.00 | 0.0 | 30.81 |
| 5 | 32.52 | 4.93 | 51.29 |
| 10 | 39.79 | 9.56 | 64.83 |
| 15 | 41.66 | 10.54 | 80.06 |
| 20 | 41.60 | 11.61 | 94.15 |
| 25 | 40.85 | 11.84 | 93.62 |
| 30 | 40.47 | 12.10 | 89.90 |
| 35 | 36.27 | 12.51 | 104.34 |
| 40 | 30.47 | 12.73 | 121.79 |
| 45 | 29.69 | 12.64 | 129.49 |
| 50 | 32.21 | 12.82 | 138.01 |
| 55 | 30.61 | 13.29 | 150.78 |
| 60 | 28.13 | 12.88 | 169.63 |
| 65 | 26.40 | 11.95 | 199.55 |
| 70 | 23.83 | 9.10 | 236.89 |
| 75 | 21.11 | 8.63 | 262.49 |
| 80 | 17.65 | 16.98 | 259.26 |
| 85 | 16.63 | 12.88 | 252.31 |
| 90 | 23.40 | 17.87 | 236.43 |
| 95 | 30.13 | 24.85 | 211.41 |
| 100 | 53.27 | 59.67 | 188.21 |
| 105 | 82.56 | 67.34 | 153.68 |
| 110 | 99.00 | 67.53 | 75.88 |
| 115 | 83.15 | 74.06 | 99.47 |
| 120 | 37.84 | 82.29 | 340.17 |
| 125 | 16.21 | 66.56 | 574.78 |
| 130 | 36.42 | 62.00 | 697.64 |
| 135 | 58.73 | 67.23 | 853.64 |
| 140 | 66.80 | 64.88 | 1264.72 |
| 145 | 50.39 | 64.59 | 2009.02 |
| 150 | 32.76 | 69.66 | 2926.14 |
| 155 | 50.84 | 66.11 | 4037.89 |

A representative determination of Q for a pair of films A and B at 5° C. is as follows. Referring to Tables 2, 3 and 4, delta CTE values for films A and B at 5° C. and a corresponding Q value is determined as follows:

$$MD\Delta CTE_{AB,5°C.} = (36.51 - 8.93)$$
$$= 27.58$$

$$CD\Delta CTE_{AB,5°C.} = (24.31 - 7.08)$$
$$= 17.23$$

$$Q_{AB,5°C.}[(27.58)^2 + (17.23)^2]^{1/2} = 32.52$$

Referring further to Tables 3 and 4, delta CTE values for films A and D at 5° C. and a corresponding Q value is determined as follows:

$$MD\Delta CTE_{AD,5°C.} = (53.59 - 8.93)$$
$$= 44.65$$

$$CD\Delta CTE_{AD,5°C.} = (32.31 - 7.08)$$
$$= 25.23$$

$$Q_{AD,5°C.} = [(44.65)^2 + (25.23)^2]^{1/2} = 51.29$$

Another preferred characteristic of the preferred embodiment multilayer laminates having the noted Q values is that the laminates exhibit a T-peel force within a particular range. Generally, the preferred laminates exhibit a T-peel force within a range of from about 1.0N/inch to about 10N/inch, and more preferably within a range of from about 1.0N/inch to about 3.0N/inch.

The T-peel force of a laminate is determined as follows. Samples of the laminate to be tested are obtained. For example, laminated samples are provided comprising at least two polymeric films having a layer of a pressure sensitive adhesive disposed between the films. Each laminated sample has a width of 25 mm and a length of 200 mm. Each of the two polymeric films at an end of a sample are then separated from one another by pulling the ends of the film in opposite directions from each other and in a direction generally perpendicular to the longitudinal axis of the sample. The resulting configuration of the sample resembles the letter "T." Pulling the films apart from an end of the sample is continued until a 50 mm portion of each film is separated and a 150 mm portion of the laminated sample remains.

The sample is then placed in a testing device capable of measuring tensile force at various speeds. Preferably, conditions utilized at testing are a temperature of 23° C.+/−3° C., and a relative humidity of 50%+/−5%. The tensile testing device is configured to measure tensile force over a distance of 200 mm from an initial grip to grip separation distance of 40 mm. The rate or speed of grip separation is 300 mm/minute. The sample is positioned in the testing device such that each of the films is pulled away from one another and in a direction perpendicular to the longitudinal axis of the sample. The average tensile force and standard deviation was noted over the course of testing for each sample.

In accordance with the present invention, when designing and/or preparing multilayer laminates having at least one interior adhesive layer and particularly multilayer laminates for sealing applications, it is preferred to select the films on opposite sides of the adhesive layer such that the Q value for the selected films is less than 1,000 µm/m ° C., preferably less than 500 µm/m ° C., and most preferably less than 100 µm/m ° C. Typically, the films will be disposed immediately adjacent to the adhesive layer, however the invention includes embodiments in which one or more additional layers or regions of materials are disposed between the adhesive layer and one or both of the film layer(s). Preferably, the adhesive layer includes one or more pressure sensitive adhesives.

By utilization of these key aspects, potentially with other features of the preferred embodiment cover laminate as described herein, very specific adhesion, resealing, and opening characteristics of the cover laminate can be achieved. The laminates and resealable flaps described herein can be used to form an assortment of different resealable packages and containers.

Preferred Embodiment Assemblies

FIG. 1 illustrates a preferred embodiment resealable packaging laminate 10 in accordance with the present invention. The packaging laminate 10 comprises a laminate body 20 defining a generally hollow interior (not shown) and an aperture 60 providing access thereto. The laminate 10 also comprises a positionable flap 30 defining a proximal region 34 and a distal region 36. The proximal region generally extends between a first proximal location 34a and a second proximal location 34b. The flap 30 is connected to or otherwise affixed or secured to the body 20 of the laminate 10 along at least a portion of its proximal region 34. The flap 30 is positionable such that the flap can be moved from an open position such as depicted in FIG. 1, to a closed position in which the flap 30 covers the aperture 60 and preferably sealingly engages the laminate body 20.

Preferably, the flap 30 defines a resealable region 32 extending about an outer periphery of the flap 30. That is, it is preferred that the resealable region 32 extends along an underside of the flap 30 from the first proximal location 34a to the distal region 36 of the flap, and to the second proximal location 34b. As explained in greater detail herein, preferably the resealable region 32 includes exposed pressure sensitive adhesive. The remaining region of the flap 30 exclusive of the flap resealable region 32 is referred to herein as a flap remainder region 38 and is described in greater detail herein.

The laminate body 20 defines a resealable region 62 extending about the aperture 60. As explained in greater detail herein, preferably the resealable region 62 includes exposed release material. The resealable region 62 is preferably shaped and sized so as to correspond to the flap resealable region 32 of the flap 30. It is also preferred that the laminate body resealable region 62 is directed towards the flap resealable region 32. Thus, upon closing the flap 30 and thereby covering the aperture 60, the flap resealable region 32 is contacted with the resealable region 62 of the laminate body 20. Preferably, the extent of contact between the resealable regions 32 and 62 is such that at least 80%, more preferably at least 90%, more preferably at least 95%, and most preferably at least 98% of the total surface area of the two resealable regions 32 and 62 are in contact with one another. This configuration promotes sealing and secure engagement between the flap 30 and the laminate body 20.

A wide array of constructions and configurations may be utilized for the flap 30. Preferably, the flap 30 includes an outer flap portion 50 and an inner flap portion 40, which are preferably secured or otherwise affixed to one another to form a unitary flap or similar member. As depicted in FIG. 1, it is preferred that the outer flap portion 50 be larger, i.e. have a larger surface area, than the inner flap portion 40. Moreover, it is preferred that the inner flap portion 40 be centrally located along an underside of the outer flap portion 50. The remaining exposed underside of the outer flap portion 50 extending about the inner flap portion 40 may constitute the previously described resealable region 32 of the flap 30. This resulting configuration provides a flap having a reduced thickness about its outer edge, and an increased thickness along interior regions.

For flaps comprising outer and inner flap portions 50 and 40, and particularly those that provide regions of differing thickness as noted, it is preferred to form a region of reduced thickness in the laminate body 20 extending about the aperture 60. This region of reduced thickness can constitute the resealable region 62 of the laminate body 20. Preferably, the sum of the thickness of the laminate in the resealable region 62 and the thickness of the outer flap portion 50 in the resealable region 32 is equal to the thickness of the flap 30 in the remainder region 38.

Figure 2:
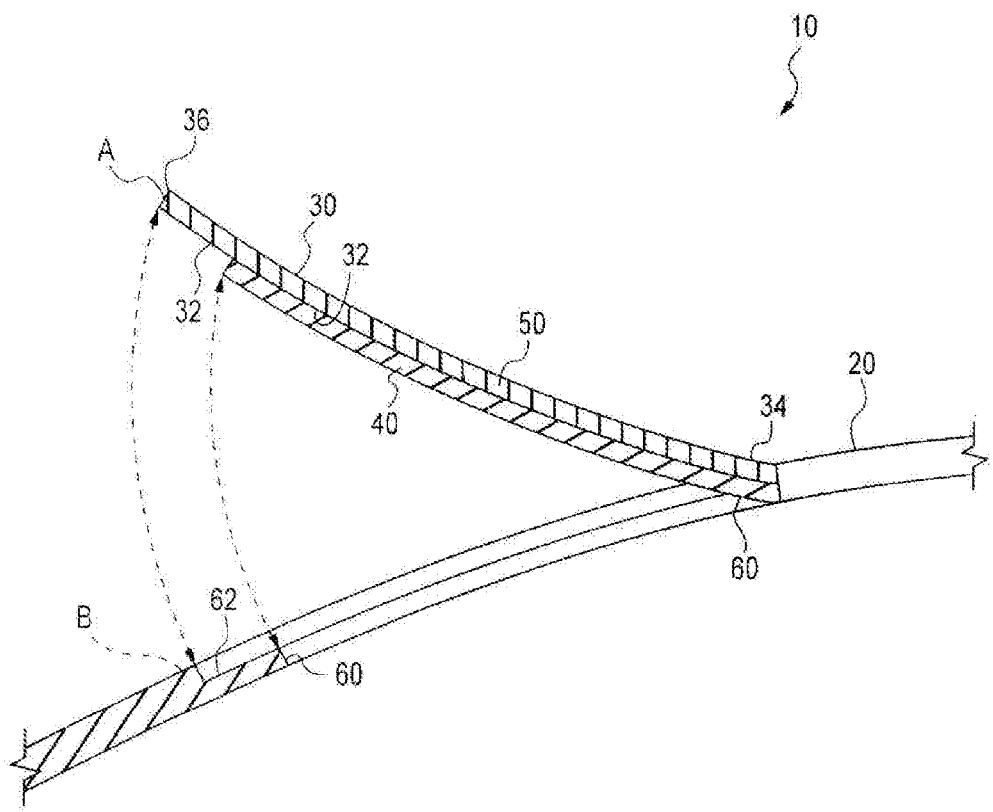
FIG. 2 is a cross sectional view taken across line 2-2 in FIG. 1 illustrating in greater detail a preferred sealing configuration of the flap.

FIG. 2 is a partial cross sectional view of the resealable packaging laminate 10 shown in FIG. 1. Specifically, the cross section is taken across line 2-2 in FIG. 1 and so reveals a cross section of the outer flap portion 50 and the inner flap portion 40, and a corresponding configuration of the aperture 60 and the resealable region 62 of the laminate body 20 extending about the aperture 60. FIG. 2 also illustrates the flap 30 in position A and closure of the flap 30 to position B to thereby cover the aperture 60. Upon positioning the flap 30 to its closed position designated as position B in FIG. 2, it can be seen that the flap resealable region 32 is contacted with the laminate body resealable region 62. It will be appreciated that the flap 30 depicted in FIG. 2 may be opened to a much greater extent than that shown in FIG. 2. Furthermore, it will be appreciated that the flap 30 may, upon being opened, exhibit an arcuate or curved shape as a result of the flexible characteristic of the laminate.

Figure 3:
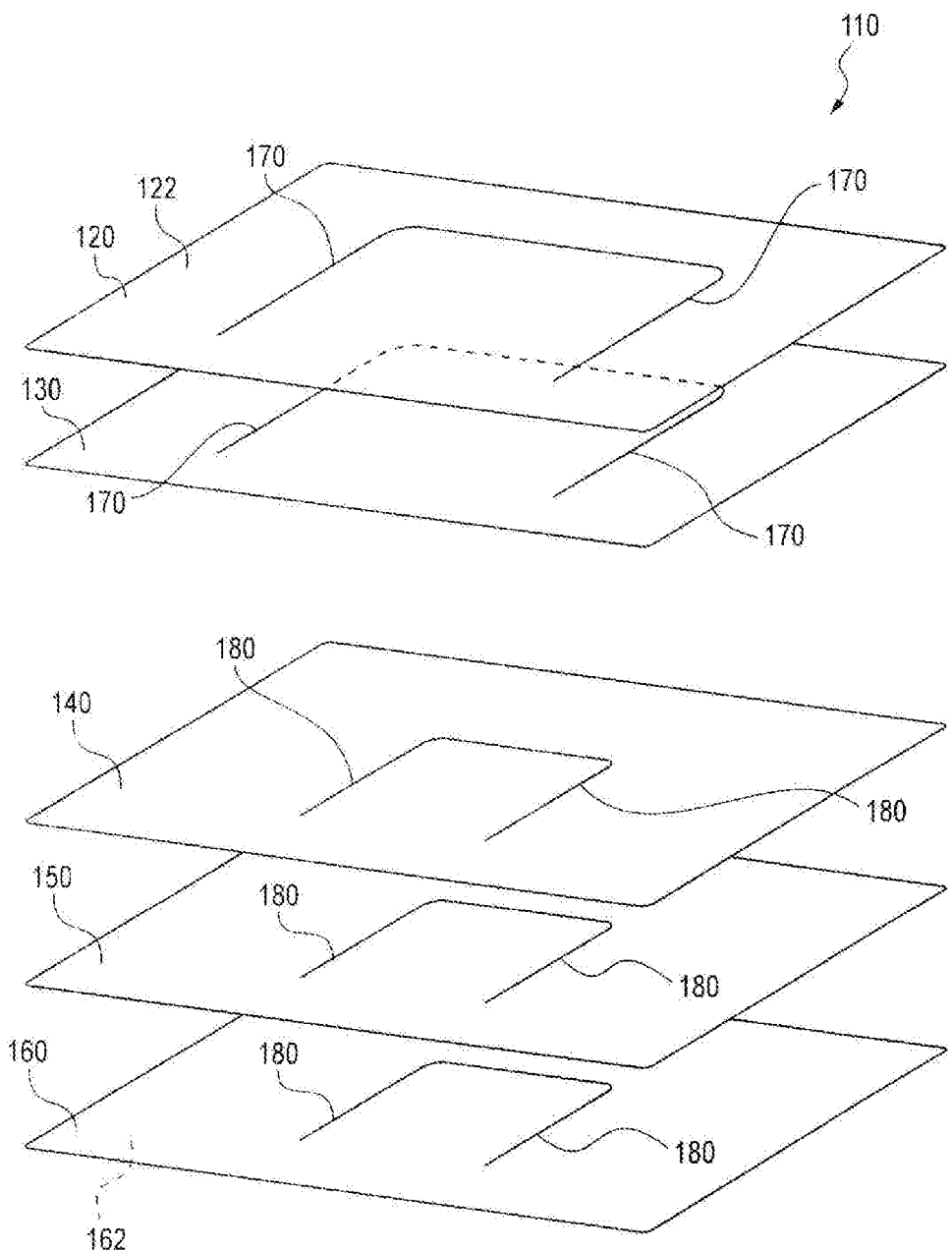
FIG. 3 is an exploded schematic view of a preferred assembly used in the laminates described herein.

FIG. 3 is an exploded schematic view of a preferred laminate assembly 110 in accordance with the present invention. The preferred assembly 110 comprises a plurality of layers which may be arranged in a wide array of different orders and configurations. However, an exemplary preferred arrangement is shown in FIG. 3. The assembly 110 comprises an outer layer 120 defining an outer face 122, an adhesive layer 130, a release layer 140, a filmic layer 150, and an inner sealing layer 160. The inner sealing layer 160 defines an inner face 162. Preferably, the adhesive layer 130 is disposed immediately adjacent to the release layer 140. One or more barrier layers (not shown) can be incorporated in the laminate 110 alongside or between any of the layer(s) illustrated.

The plurality of layers 120, 130, 140, 150, and 160, and one or more additional layers are preferably formed into a flexible laminate that is used for the previously described packaging laminate 10 and specifically, the flap 30 and laminate body 20 described in conjunction with FIGS. 1 and 2.

In accordance with the present invention, one or more cuts, slits, or other incisions into the layers are formed to produce a flap member. Preferably, the various cuts are formed in such a manner to produce a flap with a resealable or reseal region and a laminate body having a corresponding resealable or reseal region for sealingly engaging the flap thereto. A preferred configuration for such cuts is depicted in FIG. 3. Preferably, a cut, slit or incision, generally referred to herein as a "die cut" and depicted as 170 in FIG. 3 is formed in one or more outer layers such as the outer layer 120 and the adhesive layer 130. Preferably, the die cut 170 in each of the layers 120 and 130 is of the same size, the same shape and the same orientation. The die cut 170 is generally referred to herein as an outer die cut. Preferably, another cut, slit or incision, also referred to herein as a "die cut" and depicted in FIG. 3 as 180, is formed in one or more inner layers such as the release layer 140, the filmic layer 150, and the inner sealing layer 160 as shown. Preferably, the die cut 180 in each of the layers 140, 150, and 160 is of the same shape, the same size, and the same orientation. The die cut 180 is generally referred to herein as an inner die cut. Upon assembly of the layers, the die cut 170 in the layers 120 and 130 forms an outer flap portion such as the outer flap portion 50 depicted in FIGS. 1 and 2. And, the die cut 180 in layers 140, 150, and 160 forms an inner flap portion such as the inner flap portion 40 depicted in FIGS. 1 and 2.

It will be appreciated that the die cuts 170 and 180 may each be in a variety of different forms besides the U-shaped configurations depicted in FIG. 3. For example, die cuts that are arcuate in shape may be used. Alternatively, poly-sided non-rectangular shaped configurations may be used for the various die cuts. It will be appreciated that the shape selected for the outer die cut 170 will determine the shape of the resulting flap. And, the shape selected for the inner die cut 180 will determine the shape of the resulting aperture in the laminate.

Figure 4:
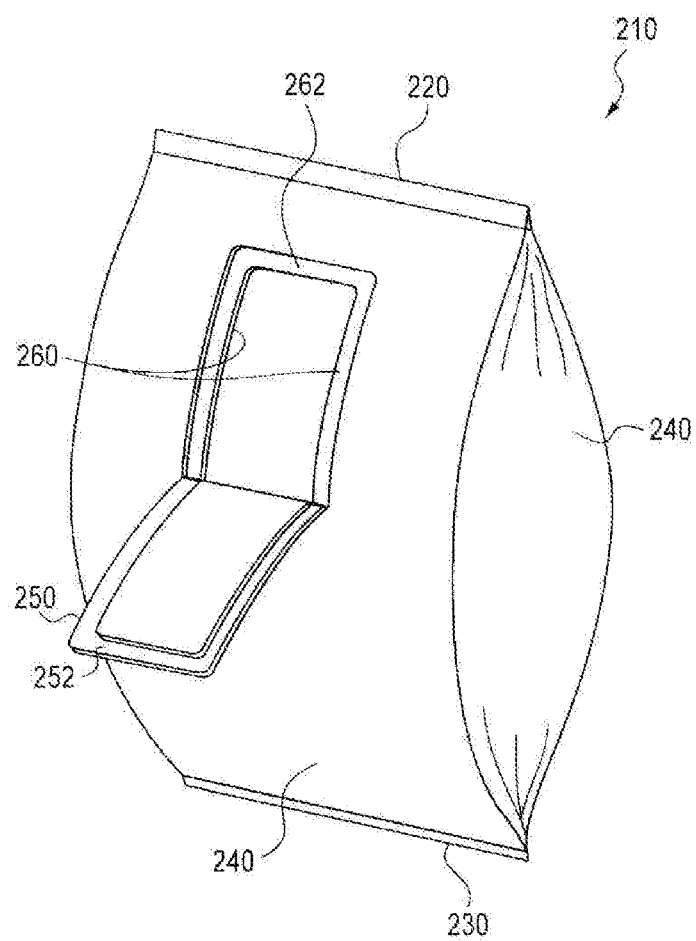
FIG. 4 is a schematic perspective view of a preferred embodiment resealable bag container and positionable flap in accordance with the present invention.

FIG. 4 illustrates a preferred embodiment resealable bag container 210 in accordance with the present invention. The bag container 210 comprises a first end 220, a second end 230, and one or more side walls 240 extending between the ends 220 and 230. The ends 220 and 230 are preferably heat sealed to thereby form a closed and sealed package or container. Defined in the side wall 240 is an aperture 260. A reseal region 262 extends about the periphery of the aperture 260. The container 210 also comprises a positionable flap 250 that includes a reseal region 252. As depicted in FIG. 4, the flap reseal region 252 extends about the outer periphery of the flap 250. As previously described herein, it is preferred that the reseal regions 262 and 252 are similarly sized, shaped, and configured so as to sealingly contact one another upon closing the flap 250.

Referring further to FIG. 4, it is preferred that a region of an adhesive, and preferably a pressure sensitive adhesive, is exposed within the reseal region 252 of the flap 250. It is also preferred that a region of a release material is exposed within the reseal region 262 of the side wall 240. This configuration promotes sealing engagement between the flap 250 and the side wall 240 upon closing the flap 250 and covering the aperture 260.

Figure 5:
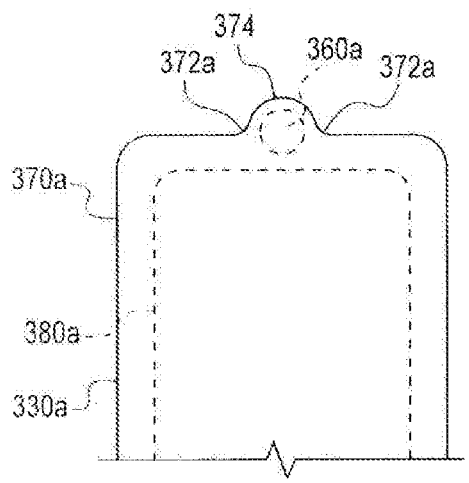
FIGS. 5-10 illustrate various preferred tab configurations and tamper identifying provisions in accordance with the present invention.
Figure 6:
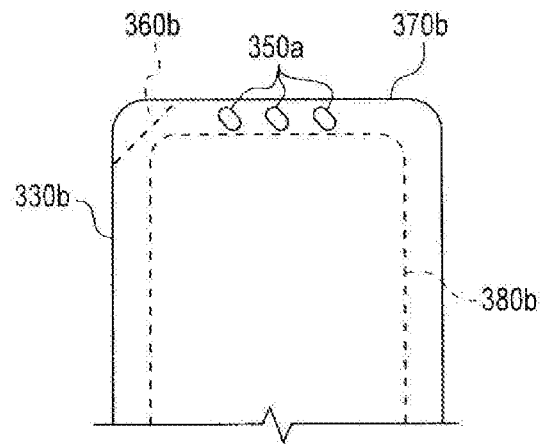
Figure 7:
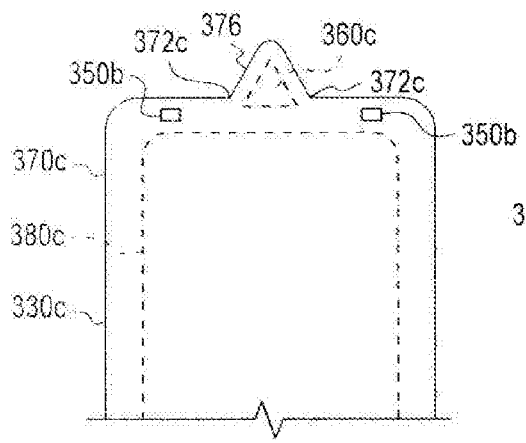
Figure 8:
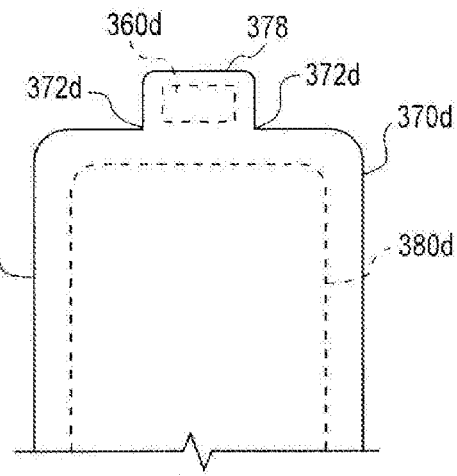

FIGS. 5-10 illustrate additional features of the present invention including for example various tabs for grasping flaps and provisions for identifying that tampering or previous opening of the flap from its adjacent side wall or laminate body has occurred. FIGS. 5-10 each illustrates an outer die cut 370a, 370b, 370c, 370d, 370e, and 370f; and an inner die cut shown in dashed lines as 380a, 380b, 380c, 380d, 380e and 380f. These die cuts, as will be understood, form flaps 330a, 330b, 330c, 330d, 330e, and 330f as shown in FIGS. 5-10, respectively. One or more tabs 374, 376, and 378 may be provided for facilitating grasping of a flap. The one or more tabs are formed as a result of forming the outer die cut. The tabs are preferably located at or near a distal end of the flap. The tabs may be in a variety of shapes such as, but not limited to an arcuate shape, a triangular shape, or a rectangular shape, as depicted in FIGS. 5, 7, and 8, respectively. It is also contemplated that a tab which does not extend beyond the outer die cut can be provided such as in FIG. 6.

Preferably, in accordance with another aspect of the present invention, grasping of a tab can be further facilitated by selective deposition of an effective amount of an adhesive deadening material. Referring to FIGS. 5-10, it will be understood that extending between the outer die cut and the inner die cut are reseal regions. And, these reseal regions correspond to areas of contact between an exposed region of a pressure sensitive adhesive and an exposed region of a release material. Thus, by selective placement of a region of adhesive deadening material within the reseal region and proximate a tab of a flap, and between the adhesive and the release material, the tab can be more easily grasped and less affixed to the underlying surface. FIG. 5 illustrates a region 360a of an adhesive deadening material deposited upon exposed release material within a reseal region extending between the outer die cut 370a and the inner die cut 380a. The region 360a of deadening material is proximate the arcuate tab 374 of the flap 330a. And, FIG. 6 illustrates a region 360b of an adhesive deadening material deposited upon exposed release material within a reseal region extending between the outer die cut 370b and the inner die cut 380b. The region 360b of deadening material is proximate a tab resulting in the corner region of the outer die cut 370b of the flap 330b. Similarly, FIG. 7 illustrates a region 360c of an adhesive deadening material deposited upon exposed release material within a reseal region extending between the outer die cut 370c and the inner die cut 380c. The region 360c of deadening material is proximate the triangular tab 376 of the flap 330c. Likewise, FIG. 8 illustrates a region 360d of an adhesive deadening material deposited upon exposed release material within a reseal region extending between the outer die cut 370d and the inner die cut 380d. The region 360d of the deadening material is proximate the rectangular tab 378 of the flap 330d.

The present invention also provides tamper identification provisions that indicate whether a flap has been initially opened. These provisions are in the form of one or more non-continuous die cut segments. These small non-continuous die cut segments extend between adjacent die cuts and are initially in the form of uncut or otherwise integral material in the associated layers. Upon initially opening a flap from its corresponding body or side wall, the small non-continuous die cut segments tear, rupture, or otherwise separate generally along a line extending between adjacent neighboring die cuts. Thus, torn or severed non-continuous die cut segments indicate that the flap has previously been initially opened.

FIGS. 5, 7, and 8 depict representative tamper identifiers in the form of non-continuous die cut segments. Referring to FIG. 5, non-continuous die cut segments 372a separate the arcuate die cut forming tab 374 from the remaining portions of outer die cut 370a. As will be understood, upon initially opening the flap 330a, the tab 374 resulting from the arcuate segment is grasped and pulled. This operation results in rupture of the segments 372a. FIG. 7 depicts non-continuous segments 372c separating the triangular die cut segment forming tab 376 from the outer die cut 370c. And FIG. 8 illustrates non-continuous segments 372d separating the rectangular die cut segment forming tab 378 from the outer die cut 370d.

Figure 9:
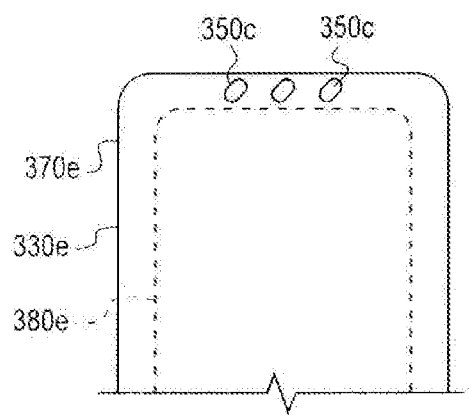
Figure 10:
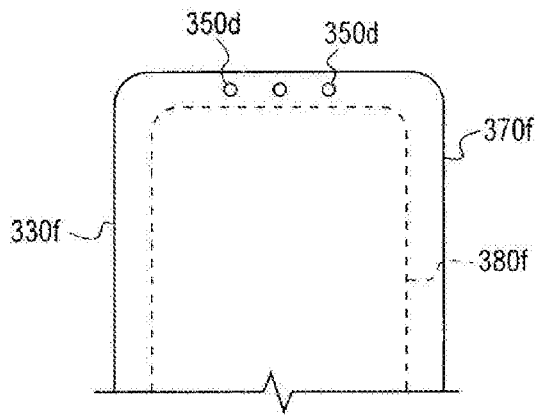

The present invention also provides tamper identification provisions in the form of one or more die cut "islands" located within the reseal region extending between the outer die cut and the inner die cut. The islands are die cut through the thickness of a flap, and preferably in the area of reduced thickness in the flap reseal region. These tamper die cuts preferably extend through an outer layer and an adhesive layer. The tamper die cuts may also extend through a release layer. The tamper identifying islands may be provided in any number, shape, and area within a reseal region. FIG. 6 illustrates three tamper identifiers 350*a* in the form of ovals and generally oriented at an acute angle to one or more sides of the outer die cut 370*b*. FIG. 7 illustrates two tamper identifiers 350*b* in the form of rectangles located in the reseal region. FIG. 9 depicts three oval-shaped tamper identifiers 350*c*. And, FIG. 10 illustrates three circular tamper identifiers 350*d* located in a reseal region. It will be understood that the island tamper identifiers function by providing a visual indication that the corresponding flap has been previously opened. Once the flap is opened, the die cut islands remain in a flap receiving area of the body or side wall. Upon closing the flap, it is virtually impossible to align the resulting apertures in the flap with the projecting islands, and also nearly impossible to insert the islands into each of their corresponding apertures in the flap. These aspects are described in greater detail in conjunction with FIG. 11.

Figure 11:
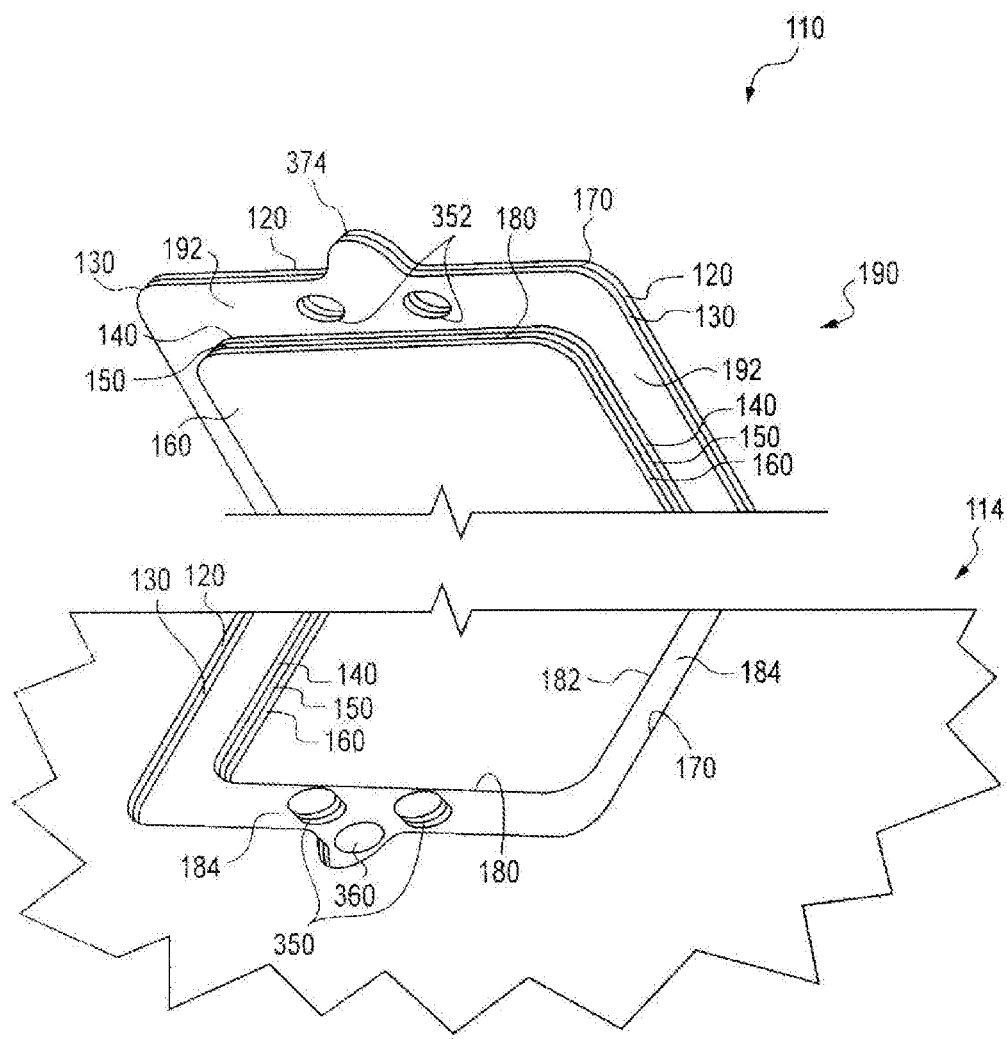
FIG. 11 is a detailed schematic view illustrating the assembly of FIG. 3 formed into a preferred laminate and resealable flap in accordance with the present invention.

FIG. 11 schematically illustrates the laminate assembly 110 shown in exploded fashion in FIG. 3, after formation into a laminate body 114 and a flap 190 attached thereto. Referring to FIG. 11, the flap 190 includes the outer layer 120 and the adhesive layer 130. A portion of adhesive is exposed within the flap reseal region 192 extending about the outer periphery of the flap 190. The layers 120 and 130 generally correspond to an outer flap portion as previously described. The flap 190 further comprises a release layer 140, a filmic layer 150, and a sealing layer 160. The layers 140, 150, and 160 are preferably centrally located along the underside of the flap 190. The layers 140, 150, and 160 generally correspond to the inner flap portion described herein. It will be understood, by further reference to FIG. 3, that the shape of the outer flap portion is dictated by the shape of the outer die cut 170; and that the shape of the inner flap portion is dictated by the shape of the inner die cut 180.

The flap 190 may also be provided with an arcuate shaped tab 374. Preferably, the tab is located at a distal end of the flap 190. The flap 190 may also define one or more apertures 352 resulting from die cutting corresponding tamper identifying islands 350, and opening the flap 190.

The laminate body 114 also comprises the outer layer 120, the adhesive layer 130, the release layer 140, the filmic layer 150, and the sealing layer 160. An aperture 182 is defined in the laminate body 114 and results from the inner die cut 180 best shown in FIG. 3. A reseal region 184 extends about the aperture 182 and generally between the outer die cut 170 and the inner die cut 180. A portion of the release layer 140 is exposed within the reseal region 184. An effective amount of an adhesive deadening material 360 is located in the reseal region 184 and preferably at a location corresponding to the tab 374 upon closing the flap 190. The laminate body 114 also includes a plurality of tamper identifier islands 350, as previously described herein.

Figure 12:
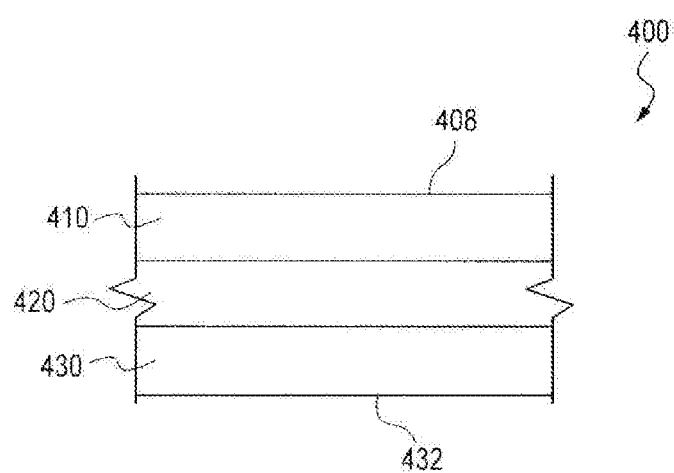
FIG. 12 is a schematic cross sectional view of a preferred embodiment laminate or laminate portion in accordance with the present invention.

FIG. 12 is a schematic cross sectional view of a laminate or portion of a laminate in which two layers, disposed on opposite faces of an adhesive layer have particular thermal expansion characteristics relative to one another. Specifically, FIG. 12 depicts a laminate 400 comprising a first polymeric film or layer 410, an adhesive layer 420, and a second polymeric film or layer 430. The first polymeric layer 410 defines an outer face 408. The second polymeric layer 430 defines an outer face 432. The thermal expansion characteristics of the layers 410 and 430 are such that the two dimensional vector delta CTE (or CTS) value or "Q" value as noted herein, is less than 1,000 μm/m ° C., preferably less than 500 μm/m ° C., and most preferably less than 100 μm/m ° C. Also, as previously explained, the laminate 400 preferably exhibits a T-peel force of from about 0.2 N/inch to about 7 N/inch, and more preferably within a range of from about 1.8 N/inch to about 2.8 N/inch. Determination of T-peel forces is performed as described herein.

The present invention also provides a method for opening and resealing a previously thermally sealed package. The method comprises separating a first portion of the laminate, i.e. the flap from a remaining second portion of the laminate. This results in separation of the pressure sensitive adhesive layer from the release layer in the noted resealable region(s) to thereby expose a region of the pressure sensitive adhesive and a corresponding region of the release layer. As laminate separation does not occur elsewhere, the package is readily opened and the interior of the container becomes accessible. The method also comprises matingly contacting the exposed region of pressure sensitive adhesive to the exposed region of the release layer, to thereby reseal the package. The term "matingly contacting" refers to positioning the flap having the exposed region of pressure sensitive adhesive, such that this region is aligned with the corresponding exposed region of release layer in the remaining laminate portion. Preferably, upon matingly contacting these regions to another, the entirety of each region is contacted with the other, or very nearly so.

Select regions of the laminate are thermally adhered to one another by contacting a first region of sealing layer of the laminate to another region of the laminate and preferably to another region of the sealing layer of the laminate. The method also includes heating the sealing layer to a temperature of from about 120° C. to about 130° C. for a time period of at least 2 seconds.

The preferred laminates are formed by appropriate arrangement and desired ordering of layers. Generally, a collection of one or more outer layers such as the outer layer and the pressure sensitive adhesive layer are applied to one another. An outer die cut is then formed in this collection of layers. If one or more tabs and/or non-continuous uncut tamper identifiers are to be provided, the outer die cut pattern is appropriately configured as described herein to provide such provisions. In addition, if one or more island type tamper identifiers are used, these are cut or otherwise formed in the outer layers as described herein. Concurrently or separately, a collection of one or more inner layers such as the inner sealing layer, a filmic layer, and a release layer are applied to one another. An inner die cut is then formed in this collection of layers. The two sets of layers are then applied together such that the pressure sensitive layer is contacted with the release layer, while ensuring proper alignment occurs between corresponding outer and inner die cuts. In the event that an amount of adhesive deadening material is to be used, that material is appropriately deposited in a reseal region defined between the outer and inner die cuts.

A flexible wall container or package can be formed from the laminate described herein by forming a relatively long and continuous tube of the previously described laminate. Preferably, this is accomplished by heat sealing a longitudinal edge of the sealing layer to an opposite longitudinal edge of the sealing layer. One end, i.e. the "bottom" of the resulting bag, is then heat sealed. The contents of the bag are then added and then the other end, i.e. the "top" of the bag, is then heat sealed.

The present invention includes the provision of multiple flaps in a single package or container. This configuration may be preferred for containers having partitioned interiors.

Many other benefits will no doubt become apparent from future application and development of this technology.

All patents, published applications, test methods or standards, and articles noted herein are hereby incorporated by reference in their entirety.

As described hereinabove, the present invention solves many problems associated with previous type devices. However, it will be appreciated that various changes in the details, materials and arrangements of parts, which have been herein described and illustrated in order to explain the nature of the invention, may be made by those skilled in the art without departing from the principle and scope of the invention, as expressed in the appended claims.

What is claimed is:

1. A resealable bag container, the container including two end sections and at least one multilayer side wall extending therebetween to thereby define a hollow interior, the container including a selectively positionable flap, the flap at least partially connected to a portion of the side wall of the container and positionable over an aperture defined in the side wall,
    the flap defining a first sealing region extending along an inner face of the flap, the flap including an adhesive layer exposed in the first sealing region;
    the side wall defining a second sealing region extending about the aperture, the side wall including a release layer exposed in the second sealing region;
    the flap configured to releasably seal with the side wall by contacting the exposed adhesive layer of the flap with the exposed release layer of the side wall;
    wherein the multilayer side wall of the container includes an adhesive layer having the same composition as the adhesive layer in the flap;
    wherein the flap further defines a flap remainder region exclusive of the first sealing region, the flap including a plurality of layers in the flap remainder region, the plurality of layers in the flap remainder region comprising: an outer layer, an adhesive layer adjacent to the outer layer, an inner sealing layer, a filmic layer adjacent to the inner sealing layer; and a release layer disposed between the adhesive layer and the filmic layer, the release layer contacting the adhesive layer, wherein the outer layer and the filmic layer exhibit a two dimensional vector delta CTE (or CTS) value Q of less than 1,000 µm/m° C., wherein an adhesive deadening material is disposed between the exposed adhesive in the flap and the exposed release layer in the side wall.

2. The resealable bag container of claim 1 wherein Q is less than 500 µm/m° C.

3. The resealable bag container of claim 2 wherein Q is less than 100 µm/m° C.

4. The resealable bag container of claim 1 wherein the laminate exhibits a T-peel force of from about 0.2 N/inch to about 7 N/inch.

5. The resealable bag container of claim 1 wherein the laminate exhibits a T-peel force of from about 1.8 N/inch to about 2.8 N/inch.

6. The resealable bag container of claim 1 wherein the flap includes a plurality of layers in the first sealing region, the plurality of layers in the first sealing region comprising:
    an outer layer; and
    an adhesive layer.

7. The resealable bag container of claim 1 wherein the flap remainder region of the flap further comprises:
    a barrier layer disposed between the outer layer and the adhesive layer.

8. The resealable bag container of claim 1 wherein the first sealing region of the flap further comprises:
    a barrier layer disposed between the outer layer and the adhesive layer.

9. The resealable bag container of claim 1 wherein the side wall further defines a side wall remainder region exclusive of the second sealing region, the side wall including a plurality of layers in the side wall remainder region, the plurality of layers in the side wall remainder region comprising:
    an outer layer;
    an adhesive layer adjacent to the outer layer;
    an inner sealing layer;
    a filmic layer adjacent to the inner sealing layer; and
    a release layer disposed between the adhesive layer and the filmic layer, the release layer contacting the adhesive layer.

10. The resealable bag container of claim 1 wherein the side wall includes a plurality of layers in the second sealing region, the plurality of layers in the second sealing region comprising:
    an inner sealing layer;
    a release layer; and
    a filmic layer disposed between the inner sealing layer and the release layer.

11. The resealable bag container of claim 9 wherein the side wall remainder region of the side wall further comprises:
    a barrier layer disposed between the filmic layer and the sealing layer.

12. The resealable bag container of claim 11 wherein the barrier layer disposed between the filmic layer and the sealing layer is a first barrier layer, the side wall remainder region of the side wall further comprising:
    a second barrier layer disposed between the outer layer and the adhesive layer.

13. The resealable bag container of claim 1 wherein the inner sealing layer comprises a material selected from the group consisting of linear low density polyethylene (LLDPE), copolymers of polypropylene (Co-PP), terpolymers of polypropylene (Ter-PP), and glycol-modified polyethylene terephthalate (PETG), and combinations thereof.

14. The resealable bag container of claim 1 wherein the filmic layer comprises a material selected from the group consisting of co-extruded oriented polypropylene (OPP), co-extended oriented polyethylene terephthalate (BOPET), polyvinyl chloride (PVC), ortho-phthalaldehyde (OPA), and combinations thereof.

15. The resealable bag container of claim 1 wherein the adhesive layer comprises a polymeric blend of butyl acrylate and 2-ethyl-hexyl acrylate monomers.

16. The resealable bag container of claim 1 wherein the release layer comprises silicone.

17. The resealable bag container of claim 1 wherein the release layer includes a silicone slip agent modified co-extruded polypropylene film skin layer.

18. The resealable bag container of claim 1 wherein the outer layer comprises a material selected from the group consisting of polyethylene terephthalate (PET), oriented polypropylene (OPP), polyvinyl chloride (PVC), ortho-phthalaldehyde (OPA), copolymers thereof, and combinations thereof.

19. The resealable bag container of claim 7 wherein the barrier layer exhibits an oxygen permeability of less than 50 cc/m$^2$/24 hours.

20. The resealable bag container of claim 7 wherein the barrier layer exhibits a water permeability of less than 50 cc/m²/24 hours.

21. The resealable bag container of claim 7 wherein the barrier layer comprises a material selected from the group consisting of polyvinylidene chloride (PVDC), ethylene vinyl alcohol polymer (EVOH, PVA), nylon polymers, and combinations thereof.

22. The resealable bag container of claim 7 wherein the barrier layer includes a metalized aluminum layer.

23. The resealable bag container of claim 1 wherein the opening force of the flap is from about 1 N/in to about 10 N/in.

24. The resealable bag container of claim 1 wherein the flap is sealingly engaged to the side wall.

25. The resealable bag container of claim 1 further comprising:
   a printing layer disposed on the outer layer, wherein the printing layer provides the outer face of the flap.

26. The resealable bag container of claim 1 further defining at least one tamper identifier, the tamper identifier defined in the first sealing region of the flap.

27. The resealable bag container of claim 26, the tamper identifier including a tamper die cut extending through an outer layer, an adhesive layer, and a release layer.

* * * * *